(12) United States Patent
Smith et al.

(10) Patent No.: US 8,730,981 B2
(45) Date of Patent: *May 20, 2014

(54) METHOD AND SYSTEM FOR COMPRESSION BASED QUALITY OF SERVICE

(75) Inventors: Donald L. Smith, Satellite Beach, FL (US); Anthony P. Galluscio, Indialantic, FL (US); Robert J. Knazik, Cocoa Beach, FL (US)

(73) Assignee: Harris Corporation, Melbourne, FL (US)

( * ) Notice: Subject to any disclaimer, the term of this patent is extended or adjusted under 35 U.S.C. 154(b) by 895 days.

This patent is subject to a terminal disclaimer.

(21) Appl. No.: 11/425,289

(22) Filed: Jun. 20, 2006

(65) Prior Publication Data

US 2007/0291751 A1    Dec. 20, 2007

(51) Int. Cl.
*H04L 12/28*    (2006.01)
*H04L 12/56*    (2006.01)

(52) U.S. Cl.
CPC ..................................... *H04L 47/50* (2013.01)
USPC ............... 370/412; 370/389; 710/52; 710/53; 710/54

(58) Field of Classification Search
USPC ................ 370/389, 412; 710/52–54; 709/231
See application file for complete search history.

(56) References Cited

U.S. PATENT DOCUMENTS

| | | |
|---|---|---|
| 5,241,632 A | 8/1993 | O'Connell et al. |
| 5,559,999 A | 9/1996 | Maturi et al. |
| 5,560,038 A | 9/1996 | Haddock |
| 5,627,970 A | 5/1997 | Keshav |
| 5,664,091 A | 9/1997 | Keen |
| 5,671,224 A | 9/1997 | Pyhalammi et al. |
| 5,748,739 A | 5/1998 | Press |
| 5,761,445 A | 6/1998 | Nguyen |

(Continued)

FOREIGN PATENT DOCUMENTS

| | | |
|---|---|---|
| CN | 1433623 A | 7/2003 |
| CN | 1689286 A | 10/2005 |

(Continued)

OTHER PUBLICATIONS

Bakre A. V. et al: "Implementation and Performance Evaluation of Indirect TCP IEEE Transactions on Computers," vol. 46, No. 3, Mar. 1997.

(Continued)

*Primary Examiner* — Faruk Hamza
*Assistant Examiner* — Aixa A Guadalupe-Cruz
(74) *Attorney, Agent, or Firm* — Fox Rothschild, LLP

(57) ABSTRACT

Certain embodiments of the present invention provide for a system and method for preserving bandwidth in data networks. The method includes determining whether to perform functional redundancy processing for a current data set. Determining whether to perform functional redundancy processing for a current data set may be conducted according to redundancy rules. In performing functional redundancy processing, the method includes receiving a first data set and a second data set and storing the first data set in a queue. The method may also include determining whether the content of the first data set is functionally redundant to the content of said second data set. If the contents of the first data set are functionally redundant to the contents of the second data set, the method includes transmitting the first data set and dropping the second data set. Functionally redundant messages are dropped prior to transmission, optimizing bandwidth.

20 Claims, 9 Drawing Sheets

(56) References Cited

U.S. PATENT DOCUMENTS

| | | |
|---|---|---|
| 5,784,566 A | 7/1998 | Viavant et al. |
| 5,844,600 A | 12/1998 | Kerr |
| 5,887,146 A | 3/1999 | Baxter et al. |
| 5,949,758 A | 9/1999 | Kober |
| 5,960,035 A | 9/1999 | Sridhar et al. |
| 6,028,843 A | 2/2000 | Delp et al. |
| 6,044,419 A | 3/2000 | Hayek et al. |
| 6,067,557 A | 5/2000 | Hegde |
| 6,072,781 A | 6/2000 | Feeney et al. |
| 6,075,770 A | 6/2000 | Chang et al. |
| 6,115,378 A | 9/2000 | Hendel et al. |
| 6,124,806 A | 9/2000 | Cunningham et al. |
| 6,154,778 A | 11/2000 | Koistinen et al. |
| 6,170,075 B1 | 1/2001 | Schuster et al. |
| 6,185,520 B1 | 2/2001 | Brown et al. |
| 6,205,486 B1 | 3/2001 | Wei et al. |
| 6,233,248 B1 | 5/2001 | Sautter et al. |
| 6,236,656 B1 | 5/2001 | Westerberg et al. |
| 6,246,683 B1 | 6/2001 | Connery et al. |
| 6,247,058 B1 | 6/2001 | Miller et al. |
| 6,279,035 B1 | 8/2001 | Brown et al. |
| 6,301,527 B1 | 10/2001 | Butland et al. |
| 6,314,425 B1 | 11/2001 | Serbinis et al. |
| 6,332,163 B1 | 12/2001 | Bowman-Amuah |
| 6,343,085 B1 | 1/2002 | Krishnan et al. |
| 6,343,318 B1 | 1/2002 | Hawkins et al. |
| 6,363,411 B1 | 3/2002 | Dugan et al. |
| 6,397,259 B1 | 5/2002 | Lincke et al. |
| 6,401,117 B1 | 6/2002 | Narad et al. |
| 6,404,776 B1 | 6/2002 | Voois et al. |
| 6,407,998 B1 | 6/2002 | Polit et al. |
| 6,408,341 B1 | 6/2002 | Feeney et al. |
| 6,421,335 B1 | 7/2002 | Kilkki et al. |
| 6,438,603 B1 | 8/2002 | Ogus |
| 6,446,204 B1 | 9/2002 | Pang et al. |
| 6,449,251 B1 | 9/2002 | Awadallah et al. |
| 6,490,249 B1 | 12/2002 | Aboul-Magd et al. |
| 6,498,782 B1 | 12/2002 | Branstad et al. |
| 6,507,864 B1 | 1/2003 | Klein et al. |
| 6,532,465 B2 | 3/2003 | Hartley et al. |
| 6,542,593 B1 | 4/2003 | Bowman-Amuah |
| 6,556,982 B1 | 4/2003 | McGaffey et al. |
| 6,557,053 B1 | 4/2003 | Bass et al. |
| 6,560,592 B1 | 5/2003 | Reid et al. |
| 6,563,517 B1 | 5/2003 | Bhagwat et al. |
| 6,577,596 B1 | 6/2003 | Olsson et al. |
| 6,587,435 B1 | 7/2003 | Miyake et al. |
| 6,587,875 B1 | 7/2003 | Ogus |
| 6,590,588 B2 | 7/2003 | Lincke et al. |
| 6,598,034 B1 | 7/2003 | Kloth |
| 6,600,744 B1 | 7/2003 | Carr et al. |
| 6,611,522 B1 | 8/2003 | Zheng et al. |
| 6,614,781 B1 | 9/2003 | Elliott et al. |
| 6,618,385 B1 | 9/2003 | Cousins |
| 6,625,133 B1 | 9/2003 | Balachandran et al. |
| 6,625,650 B2 | 9/2003 | Stelliga |
| 6,633,835 B1 | 10/2003 | Moran et al. |
| 6,640,184 B1 | 10/2003 | Rabe |
| 6,640,248 B1 | 10/2003 | Jorgensen |
| 6,650,902 B1 | 11/2003 | Richton |
| 6,668,175 B1 | 12/2003 | Almgren et al. |
| 6,671,589 B2 | 12/2003 | Holst et al. |
| 6,671,732 B1 | 12/2003 | Weiner |
| 6,680,922 B1 | 1/2004 | Jorgensen |
| 6,687,735 B1 | 2/2004 | Logston et al. |
| 6,691,168 B1 | 2/2004 | Bal et al. |
| 6,700,871 B1 * | 3/2004 | Harper et al. ............... 370/235 |
| 6,715,145 B1 | 3/2004 | Bowman-Amuah |
| 6,728,749 B1 | 4/2004 | Richardson |
| 6,732,185 B1 * | 5/2004 | Reistad ............... 709/238 |
| 6,732,228 B1 | 5/2004 | Willardson |
| 6,741,562 B1 | 5/2004 | Keirouz et al. |
| 6,748,070 B2 | 6/2004 | Kalmanek, Jr. et al. |
| 6,760,309 B1 | 7/2004 | Rochberger et al. |
| 6,771,609 B1 | 8/2004 | Gudat et al. |
| 6,772,223 B1 * | 8/2004 | Corl et al. ............... 709/238 |
| 6,778,530 B1 | 8/2004 | Greene |
| 6,778,546 B1 | 8/2004 | Epps et al. |
| 6,798,776 B1 | 9/2004 | Cheriton et al. |
| 6,816,903 B1 | 11/2004 | Rakoshitz et al. |
| 6,819,655 B1 | 11/2004 | Gregson |
| 6,819,681 B1 | 11/2004 | Hariharasubrahmanian |
| 6,820,117 B1 | 11/2004 | Johnson |
| 6,822,940 B1 | 11/2004 | Zavalkovsky et al. |
| 6,826,627 B2 | 11/2004 | Sjollema et al. |
| 6,832,118 B1 | 12/2004 | Heberlein et al. |
| 6,832,239 B1 | 12/2004 | Kraft et al. |
| 6,839,731 B2 | 1/2005 | Alexander et al. |
| 6,839,768 B2 | 1/2005 | Ma et al. |
| 6,845,100 B1 | 1/2005 | Rinne |
| 6,850,486 B2 | 2/2005 | Saleh et al. |
| 6,854,009 B1 | 2/2005 | Hughes |
| 6,854,069 B2 | 2/2005 | Kampe et al. |
| 6,862,265 B1 | 3/2005 | Appala et al. |
| 6,862,622 B2 | 3/2005 | Jorgensen |
| 6,865,153 B1 | 3/2005 | Hill et al. |
| 6,870,812 B1 | 3/2005 | Kloth et al. |
| 6,873,600 B1 | 3/2005 | Duffield et al. |
| 6,879,590 B2 | 4/2005 | Pedersen et al. |
| 6,882,642 B1 | 4/2005 | Kejriwal et al. |
| 6,885,643 B1 | 4/2005 | Teramoto et al. |
| 6,888,806 B1 | 5/2005 | Miller et al. |
| 6,888,807 B2 | 5/2005 | Heller et al. |
| 6,891,839 B2 | 5/2005 | Albert et al. |
| 6,891,842 B2 | 5/2005 | Sahaya et al. |
| 6,891,854 B2 | 5/2005 | Zhang et al. |
| 6,892,309 B2 | 5/2005 | Richmond et al. |
| 6,901,484 B2 | 5/2005 | Doyle et al. |
| 6,904,054 B1 | 6/2005 | Baum et al. |
| 6,904,058 B2 | 6/2005 | He et al. |
| 6,907,243 B1 | 6/2005 | Patel |
| 6,907,258 B2 | 6/2005 | Tsutsumi et al. |
| 6,907,462 B1 | 6/2005 | Li et al. |
| 6,910,074 B1 | 6/2005 | Amin et al. |
| 6,912,221 B1 | 6/2005 | Zadikian et al. |
| 6,914,882 B2 | 7/2005 | Merani et al. |
| 6,917,622 B2 | 7/2005 | McKinnon, III et al. |
| 6,920,145 B2 | 7/2005 | Matsuoka et al. |
| 6,922,724 B1 | 7/2005 | Freeman et al. |
| 6,928,085 B2 | 8/2005 | Haartsen |
| 6,928,471 B2 | 8/2005 | Pabari et al. |
| 6,934,250 B1 | 8/2005 | Kejriwal et al. |
| 6,934,752 B1 | 8/2005 | Gubbi |
| 6,934,795 B2 | 8/2005 | Nataraj et al. |
| 6,937,154 B2 | 8/2005 | Zeps et al. |
| 6,937,561 B2 | 8/2005 | Chiussi et al. |
| 6,937,566 B1 | 8/2005 | Forslow |
| 6,937,591 B2 | 8/2005 | Guo et al. |
| 6,937,600 B2 | 8/2005 | Takagi |
| 6,940,808 B1 | 9/2005 | Shields et al. |
| 6,940,813 B2 | 9/2005 | Ruutu |
| 6,940,832 B2 | 9/2005 | Saadawi et al. |
| 6,941,341 B2 | 9/2005 | Logston et al. |
| 6,944,168 B2 | 9/2005 | Paatela et al. |
| 6,947,378 B2 | 9/2005 | Wu et al. |
| 6,947,943 B2 | 9/2005 | DeAnna et al. |
| 6,947,996 B2 | 9/2005 | Assa et al. |
| 6,950,400 B1 | 9/2005 | Tran et al. |
| 6,950,441 B1 | 9/2005 | Kaczmarczyk et al. |
| 6,952,401 B1 | 10/2005 | Kadambi et al. |
| 6,952,416 B1 | 10/2005 | Christie, IV |
| 6,975,638 B1 | 12/2005 | Chen et al. |
| 6,975,647 B2 | 12/2005 | Neale et al. |
| 7,023,851 B2 | 4/2006 | Chakravorty |
| 7,065,084 B2 | 6/2006 | Seo |
| 7,068,599 B1 | 6/2006 | Jiang et al. |
| 7,076,552 B2 | 7/2006 | Mandato |
| 7,095,715 B2 | 8/2006 | Buckman et al. |
| 7,149,898 B2 | 12/2006 | Marejka et al. |
| 7,200,144 B2 | 4/2007 | Terrell et al. |
| 7,251,242 B2 | 7/2007 | Schrodi |
| 7,260,102 B2 | 8/2007 | Mehrvar et al. |
| 7,289,498 B2 | 10/2007 | Yu et al. |
| 7,330,908 B2 | 2/2008 | Jungck |

(56) References Cited

U.S. PATENT DOCUMENTS

| | | | |
|---|---|---|---|
| 7,337,236 B2 | 2/2008 | Bess et al. | |
| 7,349,422 B2 | 3/2008 | Duong et al. | |
| 7,359,321 B1 | 4/2008 | Sindhu et al. | |
| 7,376,829 B2 | 5/2008 | Ranjan | |
| 7,392,323 B2 | 6/2008 | Yim et al. | |
| 7,408,932 B2 | 8/2008 | Kounavis et al. | |
| 7,424,579 B2 | 9/2008 | Wheeler et al. | |
| 7,433,307 B2 | 10/2008 | Hooper et al. | |
| 7,434,221 B2 | 10/2008 | Hooper et al. | |
| 7,437,478 B2 | 10/2008 | Yokota et al. | |
| 7,471,689 B1 | 12/2008 | Tripathi et al. | |
| 7,477,651 B2 * | 1/2009 | Schmidt et al. | 370/412 |
| 7,489,666 B2 | 2/2009 | Koo et al. | |
| 7,499,457 B1 | 3/2009 | Droux et al. | |
| 7,539,175 B2 | 5/2009 | White et al. | |
| 7,543,072 B1 | 6/2009 | Hertzog et al. | |
| 7,590,756 B2 | 9/2009 | Chan | |
| 7,720,047 B1 * | 5/2010 | Katz et al. | 370/351 |
| 7,797,406 B2 | 9/2010 | Patel et al. | |
| 7,813,359 B1 | 10/2010 | Yamawaki | |
| 7,869,428 B2 | 1/2011 | Shake et al. | |
| 7,936,772 B2 | 5/2011 | Kashyap | |
| 2001/0030970 A1 | 10/2001 | Wiryaman et al. | |
| 2002/0009060 A1 | 1/2002 | Gross | |
| 2002/0009081 A1 | 1/2002 | Sampath et al. | |
| 2002/0010792 A1 | 1/2002 | Border | |
| 2002/0062395 A1 | 5/2002 | Thompson et al. | |
| 2002/0064128 A1 | 5/2002 | Hughes et al. | |
| 2002/0091802 A1 | 7/2002 | Paul et al. | |
| 2002/0099854 A1 | 7/2002 | Jorgensen | |
| 2002/0122387 A1 | 9/2002 | Ni | |
| 2002/0122395 A1 | 9/2002 | Bourlas et al. | |
| 2002/0141338 A1 | 10/2002 | Burke | |
| 2002/0143948 A1 | 10/2002 | Maher | |
| 2002/0160805 A1 | 10/2002 | Laitinen et al. | |
| 2002/0188871 A1 | 12/2002 | Noehring et al. | |
| 2002/0191253 A1 | 12/2002 | Yang et al. | |
| 2003/0004952 A1 | 1/2003 | Nixon et al. | |
| 2003/0016625 A1 | 1/2003 | Narsinh et al. | |
| 2003/0021291 A1 | 1/2003 | White et al. | |
| 2003/0033394 A1 | 2/2003 | Stine | |
| 2003/0067877 A1 | 4/2003 | Sivakumar | |
| 2003/0103243 A1 | 6/2003 | Watanabe et al. | |
| 2003/0107988 A1 | 6/2003 | Lodha et al. | |
| 2003/0110286 A1 | 6/2003 | Antal et al. | |
| 2003/0112802 A1 | 6/2003 | Ono et al. | |
| 2003/0112822 A1 | 6/2003 | Hong et al. | |
| 2003/0112824 A1 | 6/2003 | Acosta | |
| 2003/0118107 A1 | 6/2003 | Itakura et al. | |
| 2003/0158963 A1 | 8/2003 | Sturdy et al. | |
| 2003/0163539 A1 * | 8/2003 | Piccinelli | 709/206 |
| 2003/0186724 A1 | 10/2003 | Tsutsumi et al. | |
| 2003/0189935 A1 | 10/2003 | Warden et al. | |
| 2003/0195983 A1 | 10/2003 | Krause | |
| 2003/0236828 A1 | 12/2003 | Rock et al. | |
| 2004/0001493 A1 | 1/2004 | Cloonan et al. | |
| 2004/0038685 A1 | 2/2004 | Nakabayashi | |
| 2004/0039833 A1 | 2/2004 | Ludwig et al. | |
| 2004/0057437 A1 | 3/2004 | Daniel et al. | |
| 2004/0076161 A1 | 4/2004 | Lavian et al. | |
| 2004/0077345 A1 * | 4/2004 | Turner et al. | 455/423 |
| 2004/0105452 A1 | 6/2004 | Koshino et al. | |
| 2004/0125815 A1 | 7/2004 | Shimazu et al. | |
| 2004/0131014 A1 | 7/2004 | Thompson et al. | |
| 2004/0151114 A1 | 8/2004 | Ruutu | |
| 2004/0165528 A1 | 8/2004 | Li et al. | |
| 2004/0172476 A1 | 9/2004 | Chapweske | |
| 2004/0174898 A1 | 9/2004 | Kadambi et al. | |
| 2004/0190451 A1 | 9/2004 | Dacosta | |
| 2004/0218532 A1 | 11/2004 | Khirman | |
| 2004/0228363 A1 | 11/2004 | Adamczyk et al. | |
| 2004/0252698 A1 | 12/2004 | Anschutz et al. | |
| 2005/0018627 A1 | 1/2005 | Cardei et al. | |
| 2005/0021806 A1 | 1/2005 | Richardson et al. | |
| 2005/0030952 A1 | 2/2005 | Elmasry | |
| 2005/0041669 A1 | 2/2005 | Cansever et al. | |
| 2005/0060427 A1 | 3/2005 | Phillips et al. | |
| 2005/0078672 A1 * | 4/2005 | Caliskan et al. | 370/389 |
| 2005/0114036 A1 | 5/2005 | Fruhling et al. | |
| 2005/0157660 A1 | 7/2005 | Mandato et al. | |
| 2005/0169257 A1 | 8/2005 | Lahetkangas et al. | |
| 2005/0171932 A1 | 8/2005 | Nandhra | |
| 2005/0220115 A1 | 10/2005 | Romano et al. | |
| 2005/0226233 A1 | 10/2005 | Kryuchkov et al. | |
| 2005/0232153 A1 | 10/2005 | Bishop et al. | |
| 2005/0281277 A1 | 12/2005 | Killian | |
| 2006/0036906 A1 | 2/2006 | Luciani et al. | |
| 2006/0039381 A1 | 2/2006 | Anschutz et al. | |
| 2006/0039404 A1 | 2/2006 | Rao et al. | |
| 2006/0083261 A1 | 4/2006 | Maeda et al. | |
| 2006/0104287 A1 | 5/2006 | Rogasch et al. | |
| 2006/0106753 A1 | 5/2006 | Yoon et al. | |
| 2006/0109857 A1 | 5/2006 | Herrmann | |
| 2006/0140121 A1 | 6/2006 | Kakani et al. | |
| 2006/0149845 A1 | 7/2006 | Malin et al. | |
| 2006/0165051 A1 | 7/2006 | Banerjee et al. | |
| 2006/0182126 A1 | 8/2006 | Yuen et al. | |
| 2006/0215593 A1 * | 9/2006 | Wang et al. | 370/315 |
| 2006/0286993 A1 | 12/2006 | Xie et al. | |
| 2007/0008883 A1 | 1/2007 | Kobayashi | |
| 2007/0058561 A1 | 3/2007 | Virgile | |
| 2007/0060045 A1 | 3/2007 | Prautzsch | |
| 2007/0070895 A1 | 3/2007 | Narvaez | |
| 2007/0133582 A1 | 6/2007 | Banerjee et al. | |
| 2007/0153798 A1 | 7/2007 | Krstulich | |
| 2007/0156919 A1 | 7/2007 | Potti et al. | |
| 2007/0171910 A1 | 7/2007 | Kumar | |
| 2007/0189327 A1 | 8/2007 | Konda | |
| 2007/0206506 A1 | 9/2007 | Purpura | |
| 2007/0253412 A1 | 11/2007 | Batteram et al. | |
| 2007/0263616 A1 | 11/2007 | Castro et al. | |
| 2007/0275728 A1 | 11/2007 | Lohr et al. | |
| 2007/0291656 A1 | 12/2007 | Knazik et al. | |
| 2007/0291751 A1 | 12/2007 | Smith et al. | |
| 2007/0291766 A1 | 12/2007 | Knazik et al. | |
| 2008/0065808 A1 | 3/2008 | Hoese et al. | |
| 2008/0144493 A1 | 6/2008 | Yeh | |
| 2008/0293413 A1 | 11/2008 | Sharif-Ahmadi et al. | |
| 2009/0161741 A1 | 6/2009 | Ginis et al. | |
| 2010/0094531 A1 | 4/2010 | MacLeod | |

FOREIGN PATENT DOCUMENTS

| | | |
|---|---|---|
| EP | 0853404 | 7/1998 |
| EP | 0886454 | 12/1998 |
| EP | 1052816 | 11/2000 |
| EP | 1052816 A2 | 11/2000 |
| EP | 1146704 | 10/2001 |
| EP | 1180882 A2 | 2/2002 |
| EP | 1 191 751 A2 | 3/2002 |
| EP | 1191751 | 3/2002 |
| EP | 1193938 | 3/2002 |
| EP | 1193938 | 4/2002 |
| EP | 1193938 A1 | 4/2002 |
| EP | 1300991 | 4/2003 |
| EP | 1300991 A1 | 4/2003 |
| EP | 1180882 | 10/2004 |
| EP | 1575224 | 2/2005 |
| EP | 1575224 | 9/2005 |
| EP | 1622322 | 1/2006 |
| EP | 1648125 | 4/2006 |
| JP | 3019545 | 1/1991 |
| JP | H07-007516 | 1/1995 |
| JP | 07336316 A | 12/1995 |
| JP | H08-307454 | 11/1996 |
| JP | H08-316989 | 11/1996 |
| JP | H08-316990 | 11/1996 |
| JP | H09-149051 | 6/1997 |
| JP | 9191314 | 7/1997 |
| JP | 10051495 | 2/1998 |
| JP | 10051495 A | 2/1998 |

(56) References Cited

FOREIGN PATENT DOCUMENTS

| | | |
|---|---|---|
| JP | 11122264 | 4/1999 |
| JP | 11122264 A | 4/1999 |
| JP | 2000-049866 | 2/2000 |
| JP | 2000-207234 | 7/2000 |
| JP | 2001045056 | 2/2001 |
| JP | 2001-186173 | 7/2001 |
| JP | 2001186173 | 7/2001 |
| JP | 2001-308947 | 11/2001 |
| JP | 2001-522115 | 11/2001 |
| JP | 2002-044136 | 2/2002 |
| JP | 2003-078555 | 3/2003 |
| JP | 2003 169090 A | 6/2003 |
| JP | 2003-209577 | 7/2003 |
| JP | 2003520361 A | 7/2003 |
| JP | 2003-298593 | 10/2003 |
| JP | 2003298593 | 10/2003 |
| JP | 2004-222010 | 5/2004 |
| JP | 2004159139 A | 6/2004 |
| JP | 2005-027240 | 1/2005 |
| JP | 2005 086496 A | 3/2005 |
| JP | 2005-217491 | 8/2005 |
| JP | 2005-244269 | 9/2005 |
| JP | 2005252493 A | 9/2005 |
| JP | 2006-031063 | 2/2006 |
| JP | 2006031063 | 2/2006 |
| JP | 2006-087147 | 3/2006 |
| JP | 2006-121192 | 5/2006 |
| JP | 2006-166426 | 6/2006 |
| KR | 2002-45703 | 6/2002 |
| KR | 2004-71761 | 8/2004 |
| WO | 9824208 | 6/1998 |
| WO | WO99-23786 | 5/1999 |
| WO | WO9922494 | 5/1999 |
| WO | 0008817 | 2/2000 |
| WO | WO-0048110 A2 | 8/2000 |
| WO | 0141397 A1 | 6/2001 |
| WO | WO0174027 | 10/2001 |
| WO | 0230066 | 4/2002 |
| WO | WO0230066 A1 | 4/2002 |
| WO | WO03053013 | 6/2003 |
| WO | WO03/058466 | 7/2003 |
| WO | WO2004023323 | 3/2004 |
| WO | WO-2004023740 A1 | 3/2004 |
| WO | WO2004036845 | 4/2004 |
| WO | 2005006664 | 1/2005 |
| WO | WO2005006664 | 1/2005 |
| WO | WO2005076539 | 8/2005 |
| WO | WO2006006632 | 1/2006 |
| WO | 2006001155 | 7/2006 |
| WO | WO2006071155 | 7/2006 |
| WO | WO2006071155 A1 | 7/2006 |
| WO | 2007149165 | 2/2007 |
| WO | 2007149166 | 2/2007 |
| WO | 2007130414 | 11/2007 |
| WO | 20070130415 | 11/2007 |
| WO | 2007147032 | 12/2007 |
| WO | 2007147040 | 12/2007 |
| WO | 2007149769 | 12/2007 |
| WO | 2007149805 | 12/2007 |
| WO | WO2007147032 A1 | 12/2007 |
| WO | WO2007147040 A2 | 12/2007 |
| WO | WO2007149769 A2 | 12/2007 |
| WO | WO2007149805 A2 | 12/2007 |
| WO | 2008008865 | 1/2008 |
| WO | WO2008008865 A2 | 1/2008 |
| WO | 2008016845 | 2/2008 |
| WO | 2008016846 | 2/2008 |
| WO | 2008016848 | 2/2008 |
| WO | 2008016850 | 2/2008 |
| WO | WO2008016845 A1 | 2/2008 |
| WO | WO2008016846 A2 | 2/2008 |
| WO | WO2008016848 A2 | 2/2008 |
| WO | WO2008016850 A2 | 2/2008 |

OTHER PUBLICATIONS

Orda, A. et al.: "Routing with Packet Duplication and Elimination in Computer Networks," IEEE Transactions on Communications, vol. 36, No. 7, Jul. 1988.

Pancha, P., et al.: "A Delay-Minimizing Service Policy with Guaranteed Bandwidth for Real-Time Traffic," Internet Article, Aug. 23, 1995.

Perkins, Charles E., et al.: "Quality of Service for Ad hoc On-Demand Distance Vector Routing draft-perkins-manet-aodvqos-01.txt," IETF Standard-Working-Draft, Internet Engineering Task Force, IETF, Ch. No. 1, Oct. 14, 2003.

Robles, Tomas, et al.: "QoS Support for an All-IP System Beyond 3G," IEEE Communications Magazine, vol. 39, No. 8, Aug. 2001.

Xue, Jianbo, et al.: "ASAP: An Adaptive QoS Protocol for Mobile Ad Hoc Networks," Personal, Indoor and Mobile Radio Communications, 2003. PIMRC 203. 14th IEEE Proceedings on Sep. 7-10, 2003, vol. 2, Sep. 7, 2003.

International Search Report and Written Opinion, dated Dec. 12, 2007, for International application No. PCT/US2007/071177, filed Jun. 14, 2007.

International Search Report and Written Opinion, dated Jan. 29, 2008, for International application No. PCT/US2007/071191, filed Jun. 14, 2007.

International Search Report and Written Opinion, dated Jan. 17, 2008, for International application No. PCT/US2007/071273, filed Jun. 14, 2007.

International Search Report and Written Opinion, dated Jan. 15, 2008, for International application No. PCT/US2007/074577, filed Jul. 27, 2007.

International Search Report and Written Opinion, dated Mar. 14, 2008, for International application No. PCT/US2007/011649, filed May 15, 2007.

Office Action, dated Apr. 2, 2008, for U.S. Appl. No. 11/416,057, filed May 2, 2006.

Office Action, dated Apr. 4, 2008, for U.S. Appl. No. 11/415,914, filed May 5, 2006.

Bakre A. V. et al: "Implementation and Performance Evaluation of Indirect TCP" IEEE Transactions on Computers, vol. 46, No. 3, Mar. 1997.

"CCSDS File Delivery Protocol (CFDP)—Part 1—Introduction and Overview" (CCSDS 720.1-G-2—Green Book, Sep. 2003).

"CCSDS File Delivery Protocol (CFDP) Part 2—Implementers Guide" (CCSDS 720.2-G-2, Green Book, Sep. 2003).

Chao, H-L, et al.: "Fair Scheduling with QoS Support in Wireless Ad Hoc Networks," IEEE Transactions on Wireless Communications, vol. 3, No. 6, Nov. 2004.

Gao et al., "Performance Evaluation of the CCSDS File Delivery Protocol—Latency and Storage Requirement", Dec. 10, 2004.

Information Sciences Institute, University of Southern California, "Internet Protocol DARPA Internet Program Protocol Specification," IETF Standard, Internet Engineering Task Force, IETF, CH, Sep. 1981.

International Preliminary Report on Patentability dated Feb. 6, 2008 for International Application No. PCT/US2007/071269 filed Jun. 14, 2007.

International Search Report and Written Opinion dated Apr. 28, 2008 for International Application No. PCT/US07/11650 filed May 15, 2007.

International Search Report and Written Opinion dated Apr. 28, 2008 for International Application No. PCT/US07/10559 filed May 1, 2007.

International Search Report and Written Opinion dated Apr. 29, 2008 for International Application No. PCT/US07/10558 filed May 15, 2007.

International Search Report and Written Opinion dated Jun. 5, 2008 for International Application No. PCT/US07/11651 filed May 15, 2007.

International Search Report and Written Opinion, dated Dec. 12, 2007, for International Application No. PCT/US2007/071177, Filed June 14, 2007.

(56) References Cited

OTHER PUBLICATIONS

International Search Report and Written Opinion, dated Dec. 12, 2007, for International Application No. PCT/US2007/071440, filed Jun. 18, 2007.
International Search Report and Written Opinion, dated Feb. 6, 2008, for International Application No. PCT/US2007/074592, filed Jul. 27, 2007.
International Search Report and Written Opinion, dated Jan. 15, 2008 for International Application No. PCT/US2007/074577, filed Jul. 27, 2007.
International Search Report and Written Opinion, dated Jan. 17, 2008, for International Application No. PCT/US2007/071273, filed Jun. 14, 1997.
International Search Report and Written Opinion, dated Jan. 2, 2008, for International Application No. PCT/US2007/073301, filed Jul. 12, 2007.
International Search Report and Written Opinion, dated Jan. 22, 2008, for International Application No. PCT/US2007/074599, filed Jul. 27, 2007.
International Search Report and Written Opinion, dated Jan. 24, 2008, for International Application No. PCT/US2007/074587, filed Jul. 27, 2007.
International Search Report and Written Opinion, dated Mar. 14, 2008, for International Application No. PCT/US2007/011649 filed May 15, 2007.
International Search Report and Written Opinion, dated Jan. 29, 2008, for International Application No. PCT/US2007/071191. filed Jun. 14, 1997.
International Search Report and Written Opinion, dated Jan. 2, 2008 for International Application No. PCT/US2007/073301, filed Jul. 12, 2007.
Lee, et al., "Expected File-Delivery Time of Deferred NAK ARQ in CCSDS File-Delivery Protocol", Aug. 2004, IEEE Transactions on Communications, vol. 52 Issue 8. pp. 1408-1416.
Madubata, C.D.: "Prioritization of the Joint Battle Space Infosphere (JBI) Traffic and Priority with Reciprocity CAC Protocol for the JBI Network," System Theory, 2006 Proceeding of the Thirty-Eighth Southeastern Symposium on Mar. 5, 2006.
Office Action dated Apr. 23, 2008, for U.S. Appl. No. 11/416,043, filed May 2, 2006.
Office Action dated Oct. 20, 2008, for U.S. Appl. No. 11/416,043, filed May 2, 2006.
Office Action dated Oct. 20, 2008, for U.S. Appl. No. 11/425,021, filed Jun. 19, 2006
Office Action dated Jan. 30, 2009, for U.S. Appl. No. 11/425,289, filed Jun. 20, 2006.
Office Action dated Feb. 5, 2009, for U.S. Appl. No. 11/436,912, filed May 18, 2006.
Office Action dated , May 21, 2008 for U.S. Appl. No. 11/436,912, filed May 18, 2009.
Office Action dated Oct. 16, 2008, for U.S. Appl. No. 11/436,912, filed May 18, 2006.
Office Action dated Apr. 1, 2009, for U.S. Appl. No. 11/454,206, filed Jun. 16, 2006.
Office Action dated May 30, 2008, for U.S. Appl. No. 11/454,206, filed Jun. 16, 2006.
Office Action dated Dec. 11, 2008, for U.S. Appl. No. 11/454,206, filed Jun. 16, 2006.
Office Action dated May 30, 2008, for U.S. Appl. No. 11/454,219, filed Jun. 16, 2006.
Office Action dated Dec. 15, 2008, for U.S. Appl. No. 11/454,219, filed Jun. 16, 2006.
Office Action dated Nov. 25, 2008, for U.S. Appl. No. 11/454,220, filed Jun. 16, 2006.
Office Action dated Dec. 4, 2008, for U.S. Appl. No. 11/454,662, filed Jun. 16, 2006.
Office Action dated Dec. 29, 2008, for U.S. Appl. No. 11/457,662, filed Jul. 14, 2006.
Office Action dated Dec. 29, 2008, for U.S. Appl. No. 11/461,082, filed Jul. 31, 2006.
Office Action dated Nov. 13, 2008, for U.S. Appl. No. 11/471,923, filed Jun. 21, 2006.
Office Action dated Oct. 17, 2008, for U.S. Appl. No. 11/416,057 filed May 2, 2006.
Office Action dated Feb. 9, 2009, for U.S. Appl. No. 11/416,057, filed May 2, 2006.
Office Action dated Apr. 2, 2008, for U.S. Appl. No. 11/416,057, filed May 2, 2006.
Office Action dated Apr. 2, 2009, for U.S. Appl. No. 11/415,914, filed May 5, 2006.
Office Action dated Oct. 20, 2008, for U.S. Appl. No. 11/415,914, filed May 5, 2006.
Office Action dated Apr. 2, 2008, for U.S. Appl. No. 11/415,914, filed May 5, 2006.
Office Action dated Apr. 21, 2009, for U.S. Appl. No. 11/454,220, filed Jun. 16, 2006.
Orda, A. et al.,: "Routing with Packet Duplication and Elimination in Computer Networks," IEEE Transactions on Communications, vol. 36, No. 7, Jul. 1988.
Pancha, P. et al.: "A Delay-Minimizing Service Policy with Guaranteed Bandwidth for Real-Time Traffic," Internet Article, Aug. 23, 1995.
Perkins, Charles E., et al.: "Quality of Service for Ad hoc On-Demand Distance Vector Routing draft-perkins-manet-aodvqos-01," IETF Standard-Working-Draft, Internet Engineering Task Force IETF, Ch. No. 1, Oct. 14, 2003.
Robles, Tomas et al.: "QoS Support for an All-IP System Beyond 3G," IEEE Communications Magazine, vol. 39, No. 8, Aug. 2001.
Schoenwaelder, J., "Overview of the 2002 IAB Network Management Workshop," IETF Standard, Internet Engineering Task Force, May 2003.
Tactical Data Network (TDN). USMC Concepts + Programs 2003. p. 140.
Xue, Jianbo, et al.: "ASSAP: An Adaptive QoS Protocol for Mobile Ad Hoc Networks," Personal, Indoor and Mobile Radio Communications, 2003. PIMRC 203. 14th IEEE Proceedings on Sep. 7-10, 2003, vol. 2, Sep. 7, 2003.
Office Action dated Apr. 27, 2009 for U.S. Appl. No. 11/416,043.
Advisory Action dated Jan. 12, 2010, for U.S. Appl. No. 11/454,206, filed Jun. 16, 2006.
Office Action dated Oct. 13, 2009 for U.S. Appl. No. 11/471,923, filed Jun. 21, 2006.
Office Action dated Jan. 5, 2009, for U.S. Appl. No. 11/425,281, filed Jun. 20, 2006.
Office Action dated Jun. 5, 2009, for U.S. Appl. No. 11/416,057, filed May 2, 2006.
Office Action dated Jun. 10, 2009, for U.S. Appl. No. 11/454,517, filed Jun. 16, 2006.
Office Action dated Jul. 1, 2009, for U.S. Appl. No. 11/425,281, filed Jun. 20, 2006.
Office Action dated Jul. 15, 2009, for U.S. Appl. No. 11/454,219, filed Jun. 16, 2006.
Office Action dated Oct. 5, 2009, for U.S. Appl. No. 11/496,107, filed Jul. 31, 2006.
Office Action dated Oct. 13, 2009, for U.S. Appl. No. 11/454,219, filed Jun. 16, 2006.
Office Action dated Oct. 15, 2009, for U.S. Appl. No. 11/425,281, filed Jun. 20, 2006.
Office Action dated Dec. 30, 2009, for U.S. Appl. No. 11/416,057, filed May 2, 2006.
Office Action dated May 27, 2009, for U.S. Appl. No. 11/454,662, filed Jun. 16, 2006.
Office Action dated Sep. 18, 2009 for U.S. Appl. No. 11/454,662, filed Jun. 16, 2006.
Office Action dated May 13, 2009 for U.S. Appl. No. 11/424,635, filed Jun. 16, 2006.
Office Action dated Dec. 10, 2009 for U.S. Appl. No. 11/424,635, filed Jun. 16, 2006.
Office Action dated Oct. 13, 2009 for U.S. Appl. No. 11/416,043, filed May 2, 2006.
Office Action dated Sep. 15, 2009 for U.S. Appl. No. 11/454,220, filed Jun. 16, 2006.

(56) References Cited

OTHER PUBLICATIONS

Office Action dated May 1, 2009 for U.S. Appl. No. 11/461,052, filed Jul. 31, 2006.
Office Action dated Dec. 15, 2009 for U.S. Appl. No. 11/461,052, filed Jul. 31, 2006.
Office Action dated Jun. 25, 2009 for U.S. Appl. No. 11/461,082, filed Jul. 31, 2006.
Office Action dated Oct. 28, 2009 for U.S. Appl. No. 11/461,082, filed Jul. 31, 2006.
Office Action dated Jun. 10, 2009 for U.S. Appl. No. 11/425,289, filed Jun. 20, 2006.
Office Action dated Jun. 10, 2009 for U.S. Appl. No. 11/454,519, filed Jun. 16, 2006.
Office Action dated Dec. 30, 2009 for U.S. Appl. No. 11/454,519, filed Jun. 16, 2006.
Office Action dated Jul. 1, 2009 for U.S. Appl. No. 11/436,912, filed May 18, 2006.
Office Action dated Jan. 6, 2010 for U.S. Appl. No. 11/436,912, filed May 18, 2006.
Office Action dated Jul. 21, 2009 for U.S. Appl. No. 11/457,662, filed Jul. 14, 2006.
Office Action dated Dec. 30, 2009 for U.S. Appl. No. 11/457,662, filed Jul. 14, 2006.
Office Action dated Jun. 1, 2009 for U.S. Appl. No. 11/461,242, filed Jul. 31, 2006.
Office Action dated Dec. 30, 2009 for U.S. Appl. No. 11/461,242, filed Jul. 31, 2006.
Office Action dated Oct. 26, 2009 for U.S. Appl. No. 11/454,206, filed Jun. 16, 2006.
Office Action dated Jan. 5, 2010 for U.S. Appl. No. 11/454,517, filed Jun. 16, 2006.
Office Action dated Aug. 31, 2009 for U.S. Appl. No. 11/415,914, filed May 2, 2006.
Office Action dated Jun. 15, 2009 for U.S. Appl. No. 11/425,021, filed Jun. 19, 2006.
Office Action dated Mar. 16, 2010 for U.S. Appl. No. 11/454,220, filed Jun. 16, 2006.
Office Action dated Mar. 18, 2010 for U.S. Appl. No. 11/496,107, filed Jul. 31, 2006.
Office Action dated Mar. 12, 2010 for U.S. Appl. No. 11/416,057, filed May 2, 2006.
Office Action dated Mar. 15, 2010 for U.S. Appl. No. 11/454,519, filed Jun. 16, 2006.
Office Action dated Mar. 15, 2010 for U.S. Appl. No. 11/454,662, filed Jun. 16, 2006.
Office Action dated Mar. 16, 2010 for U.S. Appl. No. 11/461,242, filed Jul. 31, 2006.
Office Action dated Jan. 28, 2010 for U.S. Appl. No. 11/454,219, filed Jun. 16, 2006.
Office Action dated Mar. 31, 2010 for U.S. Appl. No. 11/454,517, filed Jun. 16, 2006.
International Preliminary Report for PCTUS200707/436 dated Oct. 10, 2008.
ISR for PCTUS200707/436 dated Nov. 9, 2007.
Written Opinion of ISR for PCTUS200707/436 dated Nov. 9, 2007.
Extended European Search Report for PCTUS2007010558 dated Apr. 12, 2009.
International Search Report for PCTUS2007011651 dated Mar. 16, 2010.
Consultative Committee for Space Data Systems, "CCSDS File Delivery Protocol (CFDP)—Part 2—Implementers Guide," CCSDS 720.2-G-2—Green Book, Sep. 2003.
Akimeka, "LLC—Mobile Modular Command Center (M2C2) Advanced Technologies Training Program (ATTP) Final Analysis Report," 2004.
Ali et al., "Solider Network Extension (SNE) On-The-Move Satellite Communications (SATCOM) for Army Tactical Battalion-Level Network Healing and Thickening," Oct. 2007.
Applecore, "What are APIs, why use them, how to use them, and how to find out more," pp. 1-3, May 2005.
Barker, "Overcoming the Data-Scale Management Challenge in Large Dynamic Networks," Military Communications Conference, MILCOM 2005, IEEE; pp. 1-7, Oct. 2005.
Laurie, "DLL Files in Windows—What Are They?," pp. 1-2, 2004.
Lee et al., "Expected File-Delivery Time of Deferred NAK ARQ in CCSDS File-Delivery Protocol," IEEE Transactions on Communications, vol. 52, Issue 8, pp. 1408-1416, Aug. 2004.
Zheng et al., "Group-Mobility-Aware Spectrum Management for Future Digital Battlefields," Military Communications Conference, 2006, MILCOM 2006, IEEE; pp. 1-7, Oct. 2006.
Floyd et al., "Link-sharing and Resource Management Models for Packet Networks," IEEE/ACM Transactions on Networking, vol. 3, No. 4, all pages, Aug. 1995.
Chan, "Precedence Based Admission Control and Preemption in IP Networks," Military Communications Conference, 2006, MILCOM 2006, IEEE, pp. 1-7, Oct. 2006.
Office Action dated Apr. 20, 2010 for U.S. Appl.No. 11/425,281, filed Jun. 20, 2006.
Advisory Action dated Apr. 13, 2010 for U.S. Appl. No. 11/454,219, filed Jun. 16, 2006.
Notice of Panel Decision from Pre-Appeal Brief Review dated Jul. 7, 2010 for U.S. Appl. No. 11/454,219, filed Jun. 16, 2006.
Examiner's Answer to Appeal Brief dated Jul. 8, 2010 for U.S. Appl. No. 11/454,206, filed Jun. 16, 2006.
Notice of Panel Decision from Pre-Appeal Brief Review dated Mar. 26, 2010 for U.S. Appl. No. 11/454,206, filed Jun. 16, 2006.
Office Action dated May 20, 2010 for U.S. Appl. No. 11/454,517, filed Jun. 16, 2006.
Dong et al., "APV: A Highly Efficient Transport Protocol for Low Bit Rate Multimedia Connections," Multimedia Tools and Applications, pp. 187-216, 2005.
Communication Pursuant to Article 94(3) EPC, Application No. 07812151.4, dated Jan. 21, 2010.
Office Action dated May 6, 2010 for U.S. Appl. No. 11/425,021, filed Jun. 19, 2006.
Office Action dated Apr. 27, 2010 for U.S. Appl. No. 11/424,635, filed Jun. 16, 2006.
Advisory Action dated May 13, 2010 for U.S. Appl. No. 11/454,220, filed Jun. 16, 2006.
Information Sciences Institute, "Internet Protocol Darpa Internet Program Protocol Specification," pp. 1-46, Sep. 1981.
Communication Pursuant to Article 94(3) EPC, Application No. 07813469.9, dated Nov. 17, 2009.
Office Action dated Apr. 27, 2010 for U.S. Appl. No. 11/461,082, filed Jul. 31, 2006.
Office Action dated May 11, 2010 for U.S. Appl. No. 11/425,289, filed Jun. 20, 2006.
Communication Pursuant to Rule 62 EPC, Application No. 07777069.1, dated Mar. 16, 2010.
Notice of Panel Decision from Pre-Appeal Brief Review, dated Jun. 2, 2010 for U.S. Appl. No. 11/436,912 filed May 18, 2006.
Office Action dated Jun. 10, 2010 for U.S. Appl. No. 11/457,662 filed Jul. 14, 2006.
Office Action dated Sep. 30, 2010 for U.S. Appl. No. 11/425,281, filed Jun. 20, 2006, pp. 1-13.
Korean Office Action mailed Jul. 27, 2010, in Appl. No. 10-2009-7000812, pp. 3-1 to 3-3.
Office Action dated Sep. 13, 2010 for U.S. Appl. No. 11/416,057, filed May 2, 2006, pp. 1-14.
Advisory Action dated Aug. 23, 2010 for U.S. Appl. No. 11/454,517, filed Jun. 16, 2006, pp. 1-2.
Office Action dated Aug. 24, 2010 for U.S. Appl. No. 11/425,021, filed Jun. 19, 2006, pp. 1-19.
International Preliminary Report for PCT/US2007/071159 dated Dec. 16, 2008, pp. 1-7.
Madubata, C., "Prioritization of the Joint Battle Space Infosphere (JBI) Traffic and Priority With Reciprocity CAC Protocol for the JBI Network," System Theory, 2006 Proceeding of the Thirty-Eighth Southeastern Symposium, USA, IEEE; pp. 477-481, Mar. 5, 2006.
ISR for PCT/US2007/071159 dated Oct. 31, 2007, pp. 1-2.
Advisory Action dated Jul. 23, 2010 for U.S. Appl. No. 11/424,635, filed Jun. 16, 2006, pp. 1-2.

(56) References Cited

OTHER PUBLICATIONS

Translation of Japan Office Action for Patent Application No. 2009-509667, mailed Aug. 10, 2010, pp. 1-2.
Advisory Action dated Sep. 30, 2010 for U.S. Appl. No. 11/461,082, filed Jul. 31, 2006, pp. 1-2.
Office Action dated Sep. 17, 2010 for U.S. Appl. No. 11/454,519, filed Jun. 16, 2006, pp. 1-16.
Office Action dated Sep. 14, 2010 for U.S. Appl. No. 11/461,242, filed Jul. 31, 2006, pp. 1-31.
Office Action dated Jan. 20, 2011 for U.S. Appl. No. 11/461,052, filed Jul. 31, 2006, pp. 1-21.
Office Action dated Jan. 3, 2011 for U.S. Appl. No. 11/461,082, filed Jul. 31, 2006, pp. 1-15.
Translation of Office Action of Japan Patent Office, dated Nov. 2, 2010, for Patent Application No. 2009-522974, pp. 1-2.
Translation of an Office Action of JPO, dated Dec. 14, 2010, for Patent Application No. 2009-511037, pp. 1-3.
Translation of Japanese Patent Office Action, dated Jan. 4, 2011, for Patent Application No. 2009-522971, pp. 1-2.
Translation of Japanese Patent Office Action, dated Jan. 4, 2011, for Patent Application No. 2009-515400, pp. 1-2.
Translation of Japanese Patent Office Action, dated Jan. 4, 2011, for Patent Application No. 2009-515401, pp. 1-2.
Translation of Japanese Patent Office Action, dated Jan. 11, 2011, for Patent Application No. 2009-516640, pp. 1-3.
Translation of Japanese Patent Office Action, dated Jan. 11, 2011, for Patent Application No. 2009-515644, pp. 1-3.
Translation of Japanese Patent Office Action, dated Feb. 1, 2011, for Patent Application No. 2009-522973, pp. 1-3.
Translation of Japanese Patent Office Action, dated Jan. 11, 2011, for Patent Application No. 2009-516641, pp. 1-3.
Translation of Japanese Patent Office Action, dated Jan. 4, 2011, for Patent Application No. 2009-515402, pp. 1-2.
Iida, et al., "Examination of the Throughputs in Cluster for Sharing Multiple Paths System," Collected Papers of Multimedia, Distribution, Cooperation, and Mobile (DICOMO) Symposium, Symposium of the Information Processing Societies, vol. 99, No. 7, Jun. 30, 1999, pp. 231-236.
Mineno et al., "Implementation of Shared Multilink Procedures for a Cluster Network Environment," Collected Papers of Multimedia, Distribution, Cooperation, and Mobile (DICOMO) Symposium, Symposium of the Information Processing Societies, vol. 98, No. 8, Jul. 8, 1998, pp. 677-684.
Office Action dated Nov. 9, 2010 for U.S. Appl. No. 11/496,107, filed Jul. 31, 2006, pp. 1-15.
Advisory Action dated Nov. 2, 2010 for U.S. Appl. No. 11/454,219, filed Jun. 16, 2006, pp. 1-4.
Office Action dated Nov. 23, 2010 for U.S. Appl. No. 11/454,219, filed Jun. 16, 2006, pp. 1-22.
Office Action dated Dec. 6, 2010 for U.S. Appl. No. 11/454,220, filed Jun. 16, 2006, pp. 1-12.
Office Action dated Oct. 25, 2010 for U.S. Appl. No. 11/425,289, filed Jun. 20, 2006, pp. 1-23.
Office Action dated Nov. 18, 2010 for U.S. Appl. No. 11/457,662, filed Jul. 14, 2006, pp. 1-20.
Korean Office Action mailed Oct. 27, 2010 for Korean Application No. 2009-7001125, pp. 1-3.
Information about Related Patents and Patent Applications, see section 6 of the accompanying Information Disclosure Statement Letter, which concerns Related Patents and Patent Applications.
Office Action dated Apr. 19, 2011 for U.S. Appl. No. 11/425,281, filed Jun. 20, 2006, pp. 1-32.
Office Action dated Apr. 19, 2011 for U.S. Appl. No. 11/496,107, filed Jul. 31, 2006, pp. 1-37.
PCT International Preliminary Report on Patentability for Application No. PCT/US2007/011648, dated Dec. 16, 2008, pp. 1-6.
Office Action dated Apr. 13, 2011 for U.S. Appl. No. 11/416,057, filed May 2, 2006, pp. 1-39.
Office Action dated Apr. 18, 2011 for U.S. Appl. No. 11/425,289, filed Jun. 20, 2006, pp. 1-30.
Office Action dated Mar. 3, 2011 for U.S. Appl. No. 11/454,519, filed Jun. 16, 2006, pp. 1-26.
Office Action dated Apr. 25, 2011 for U.S. Appl. No. 11/457,662, filed Jul. 14, 2006, pp. 1-36.
Office Action dated Apr. 13, 2011 for U.S. Appl. No. 11/461,242, filed Jul. 31, 2006, pp. 1-47.
Translation of Japanese Office Action, Application No. 2009-515402, mailed Jan. 4, 2011, pp. 1-4.
PCT International Search Report for International Application No. PCT/US07/11648, mailed Sep. 9, 2008, pp. 1-2.
PCT International Search Report for International Application No. PCT/US2007/071197, mailed Nov. 30, 2007, pp. 1-4.
PCT International Preliminary Report for International Application No. PCT/US2007/071197, mailed Dec. 16, 2008, pp. 1-11.
PCT Written Opinion for International Application No. PCT/US2007/071197, mailed Dec. 16, 2008, pp. 1-6.
Madubata, Prioritization of The Joint Battle Space Infosphere (JBI) Traffice and Priority With Reciprocity CAC Protocol for the JBI Network, 2006 IEEE, pp. 477-481.
Laurie, "DLL Files in Windows-What Are They"?, *Internet* (snapshot from waybackmachine), at least no later than Mar. 17, 2006.

\* cited by examiner

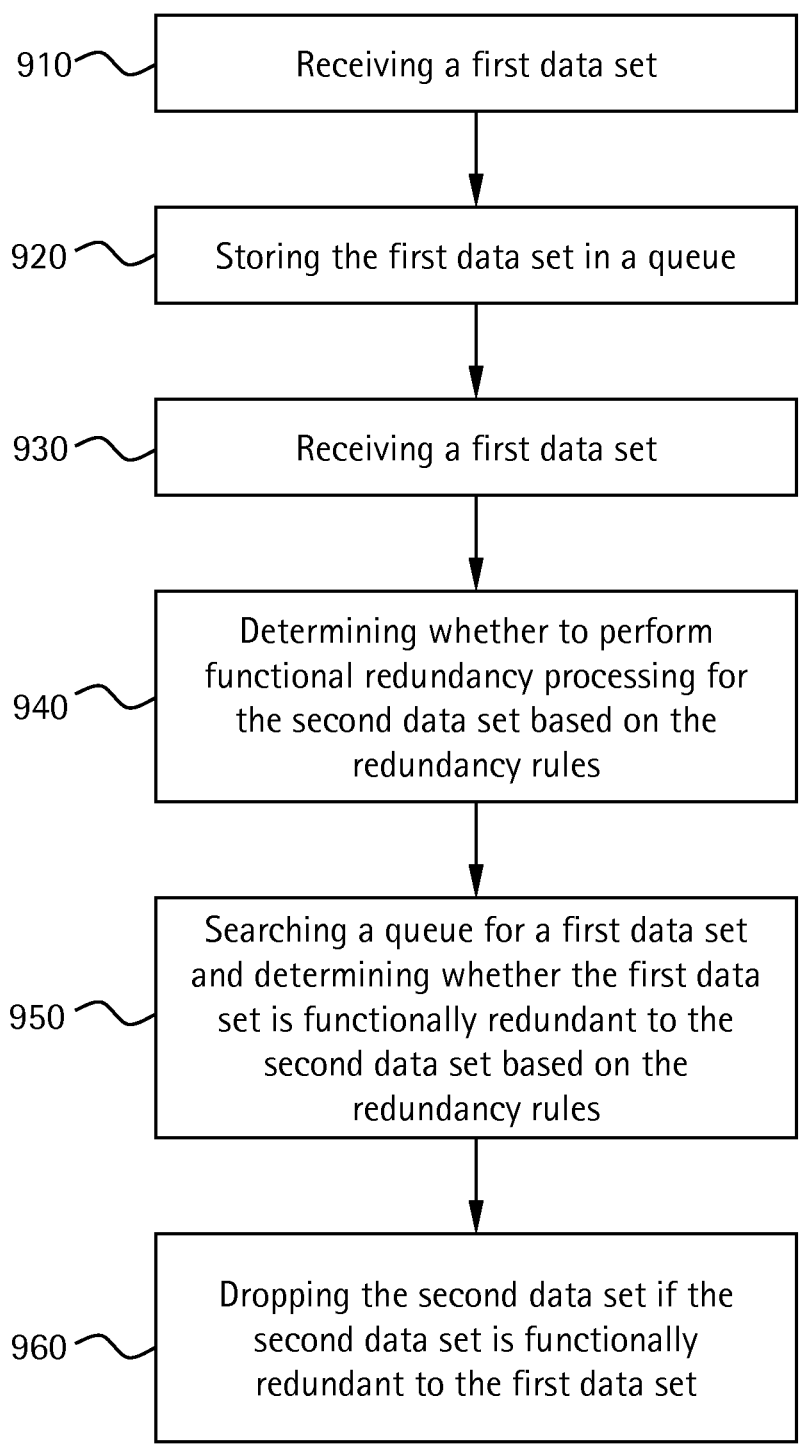

METHOD AND SYSTEM FOR COMPRESSION BASED QUALITY OF SERVICE

BACKGROUND OF THE INVENTION

The presently described technology generally relates to communications networks. More particularly, the presently described technology relates to systems and methods for protocol filtering for Quality of Service.

Communications networks are utilized in a variety of environments. Communications networks typically include two or more nodes connected by one or more links. Generally, a communications network is used to support communication between two or more participant nodes over the links and intermediate nodes in the communications network. There may be many kinds of nodes in the network. For example, a network may include nodes such as clients, servers, workstations, switches, and/or routers. Links may be, for example, modem connections over phone lines, wires, Ethernet links, Asynchronous Transfer Mode (ATM) circuits, satellite links, and/or fiber optic cables.

A communications network may actually be composed of one or more smaller communications networks. For example, the Internet is often described as network of interconnected computer networks. Each network may utilize a different architecture and/or topology. For example, one network may be a switched Ethernet network with a star topology and another network may be a Fiber-Distributed Data Interface (FDDI) ring.

Communications networks may carry a wide variety of data. For example, a network may carry bulk file transfers alongside data for interactive real-time conversations. The data sent on a network is often sent in packets, cells, or frames. Alternatively, data may be sent as a stream. In some instances, a stream or flow of data may actually be a sequence of packets. Networks such as the Internet provide general purpose data paths between a range of nodes and carrying a vast array of data with different requirements.

Communication over a network typically involves multiple levels of communication protocols. A protocol stack, also referred to as a networking stack or protocol suite, refers to a collection of protocols used for communication. Each protocol may be focused on a particular type of capability or form of communication. For example, one protocol may be concerned with the electrical signals needed to communicate with devices connected by a copper wire. Other protocols may address ordering and reliable transmission between two nodes separated by many intermediate nodes, for example.

Protocols in a protocol stack typically exist in a hierarchy. Often, protocols are classified into layers. One reference model for protocol layers is the Open Systems Interconnection (OSI) model. The OSI reference model includes seven layers: a physical layer, data link layer, network layer, transport layer, session layer, presentation layer, and application layer. The physical layer is the "lowest" layer, while the application layer is the "highest" layer. Two well-known transport layer protocols are the Transmission Control Protocol (TCP) and User Datagram Protocol (UDP). A well known network layer protocol is the Internet Protocol (IP).

At the transmitting node, data to be transmitted is passed down the layers of the protocol stack, from highest to lowest. Conversely, at the receiving node, the data is passed up the layers, from lowest to highest. At each layer, the data may be manipulated by the protocol handling communication at that layer. For example, a transport layer protocol may add a header to the data that allows for ordering of packets upon arrival at a destination node. Depending on the application, some layers may not be used, or even present, and data may just be passed through.

One kind of communications network is a tactical data network. A tactical data network may also be referred to as a tactical communications network. A tactical data network may be utilized by units within an organization such as a military (e.g., army, navy, and/or air force). Nodes within a tactical data network may include, for example, individual soldiers, aircraft, command units, satellites, and/or radios. A tactical data network may be used for communicating data such as voice, position telemetry, sensor data, and/or real-time video.

An example of how a tactical data network may be employed is as follows. A logistics convoy may be in-route to provide supplies for a combat unit in the field. Both the convoy and the combat unit may be providing position telemetry to a command post over satellite radio links. An unmanned aerial vehicle (UAV) may be patrolling along the road the convoy is taking and transmitting real-time video data to the command post over a satellite radio link also. At the command post, an analyst may be examining the video data while a controller is tasking the UAV to provide video for a specific section of road. The analyst may then spot an improvised explosive device (IED) that the convoy is approaching and send out an order over a direct radio link to the convoy for it to halt and alerting the convoy to the presence of the IED.

The various networks that may exist within a tactical data network may have many different architectures and characteristics. For example, a network in a command unit may include a gigabit Ethernet local area network (LAN) along with radio links to satellites and field units that operate with much lower throughput and higher latency. Field units may communicate both via satellite and via direct path radio frequency (RF). Data may be sent point-to-point, multicast, or broadcast, depending on the nature of the data and/or the specific physical characteristics of the network. A network may include radios, for example, set up to relay data. In addition, a network may include a high frequency (HF) network which allows long range communication. A microwave network may also be used, for example. Due to the diversity of the types of links and nodes, among other reasons, tactical networks often have overly complex network addressing schemes and routing tables. In addition, some networks, such as radio-based networks, may operate using bursts. That is, rather than continuously transmitting data, they send periodic bursts of data. This is useful because the radios are broadcasting on a particular channel that is shared by participants, and one radio may transmit at a time.

Tactical data networks are generally bandwidth-constrained. That is, there is typically more data to be communicated than bandwidth available at any given point in time. These constraints may be due to either the demand for bandwidth exceeding the supply, and/or the available communications technology not supplying enough bandwidth to meet the user's needs, for example. For example, between some nodes, bandwidth may be on the order of kilobits/sec. In bandwidth-constrained tactical data networks, less important data can clog the network, preventing more important data from getting through in a timely fashion, or even arriving at a receiving node at all. In addition, portions of the networks may include internal buffering to compensate for unreliable links. This may cause additional delays. Further, when the buffers get full, data may be dropped.

In many instances the bandwidth available to a network cannot be increased. For example, the bandwidth available over a satellite communications link may be fixed and cannot effectively be increased without deploying another satellite. In these situations, bandwidth must be managed rather than simply expanded to handle demand. In large systems, network bandwidth is a critical resource. It is desirable for applications to utilize bandwidth as efficiently as possible. In addition, it is desirable that applications avoid "clogging the pipe," that is, overwhelming links with data, when bandwidth is limited. When bandwidth allocation changes, applications should preferably react. Bandwidth can change dynamically due to, for example, quality of service, jamming, signal obstruction, priority reallocation, and line-of-sight. Networks can be highly volatile and available bandwidth can change dramatically and without notice.

In addition to bandwidth constraints, tactical data networks may experience high latency. For example, a network involving communication over a satellite link may incur latency on the order of half a second or more. For some communications this may not be a problem, but for others, such as real-time, interactive communication (e.g., voice communications), it is highly desirable to minimize latency as much as possible.

Another characteristic common to many tactical data networks is data loss. Data may be lost due to a variety of reasons. For example, a node with data to send may be damaged or destroyed. As another example, a destination node may temporarily drop off of the network. This may occur because, for example, the node has moved out of range, the communication's link is obstructed, and/or the node is being jammed. Data may be lost because the destination node is not able to receive it and intermediate nodes lack sufficient capacity to buffer the data until the destination node becomes available. Additionally, intermediate nodes may not buffer the data at all, instead leaving it to the sending node to determine if the data ever actually arrived at the destination.

Often, applications in a tactical data network are unaware of and/or do not account for the particular characteristics of the network. For example, an application may simply assume it has as much bandwidth available to it as it needs. As another example, an application may assume that data will not be lost in the network. Applications which do not take into consideration the specific characteristics of the underlying communications network may behave in ways that actually exacerbate problems. For example, an application may continuously send a stream of data that could just as effectively be sent less frequently in larger bundles. The continuous stream may incur much greater overhead in, for example, a broadcast radio network that effectively starves other nodes from communicating, whereas less frequent bursts would allow the shared bandwidth to be used more effectively.

Certain protocols do not work well over tactical data networks. For example, a protocol such as TCP may not function well over a radio-based tactical network because of the high loss rates and latency such a network may encounter. TCP requires several forms of handshaking and acknowledgments to occur in order to send data. High latency and loss may result in TCP hitting time outs and not being able to send much, if any, meaningful data over such a network.

Information communicated with a tactical data network often has various levels of priority with respect to other data in the network. For example, threat warning receivers in an aircraft may have higher priority than position telemetry information for troops on the ground miles away. As another example, orders from headquarters regarding engagement may have higher priority than logistical communications behind friendly lines. The priority level may depend on the particular situation of the sender and/or receiver. For example, position telemetry data may be of much higher priority when a unit is actively engaged in combat as compared to when the unit is merely following a standard patrol route. Similarly, real-time video data from an UAV may have higher priority when it is over the target area as opposed to when it is merely in-route.

There are several approaches to delivering data over a network. One approach, used by many communications networks, is a "best effort" approach. That is, data being communicated will be handled as well as the network can, given other demands, with regard to capacity, latency, reliability, ordering, and errors. Thus, the network provides no guarantees that any given piece of data will reach its destination in a timely manner, or at all. Additionally, no guarantees are made that data will arrive in the order sent or even without transmission errors changing one or more bits in the data.

Another approach is Quality of Service (QoS). QoS refers to one or more capabilities of a network to provide various forms of guarantees with regard to data that is carried. For example, a network supporting QoS may guarantee a certain amount of bandwidth to a data stream. As another example, a network may guarantee that packets between two particular nodes have some maximum latency. Such a guarantee may be useful in the case of a voice communication where the two nodes are two people having a conversation over the network. Delays in data delivery ill such a case may result in irritating gaps in communication and/or dead silence, for example.

QoS may be viewed as the capability of a network to provide better service to selected network traffic. The primary goal of QoS is to provide priority including dedicated bandwidth, controlled jitter and latency (required by some realtime and interactive traffic), and improved loss characteristics. Another important goal is making sure that providing priority for one flow does not make other flows fail. That is, guarantees made for subsequent flows must not break the guarantees made to existing flows.

Current approaches to QoS often require every node in a network to support QoS, or, at the very least, for every node in the network involved in a particular communication to support QoS. For example, in current systems, in order to provide a latency guarantee between two nodes, every node carrying the traffic between those two nodes must be aware of and agree to honor, and be capable of honoring, the guarantee.

There are several approaches to providing QoS. One approach is Integrated Services, or "IntServ." IntServ provides a QoS system wherein every node in the network supports the services and those services are reserved when a connection is set up. IntServ does not scale well because of the large amount of state information that must be maintained at every node and the overhead associated with setting up such connections.

Another approach to providing QoS is Differentiated Services, or "DiffServ." DiffServ is a class of service model that enhances the best-effort services of a network such as the Internet. DiffServ differentiates traffic by user, service requirements, and other criteria. Then, DiffServ marks packets so that network nodes can provide different levels of service via priority queuing or bandwidth allocation, or by choosing dedicated routes for specific traffic flows. Typically, a node has a variety of queues for each class of service. The node then selects the next packet to send from those queues based on the class categories.

Existing QoS solutions are often network specific and each network type or architecture may require a different QoS configuration. Due to the mechanisms existing QoS solutions utilize, messages that look the same to current QoS systems may actually have different priorities based on message content. However, data consumers may require access to high-priority data without being flooded by lower-priority data. Existing QoS systems cannot provide QoS based on message content at the transport layer.

As mentioned, existing QoS solutions require at least the nodes involved in a particular communication to support QoS. However, the nodes at the "edge" of network may be adapted to provide some improvement in QoS, even if they are incapable of making total guarantees. Nodes are considered to be at the edge of the network if they are the participating nodes in a communication (i.e., the transmitting and/or receiving nodes) and/or if they are located at chokepoints in the network. A chokepoint is a section of the network where all traffic must pass to another portion. For example, a router or gateway from a LAN to a satellite link would be a choke point, since all traffic from the LAN to any nodes not on the LAN must pass through the gateway to the satellite link.

Thus, there is a need for systems and methods providing QoS in a tactical data network. There is a need for systems and methods for providing QoS on the edge of a tactical data network. Additionally, there is a need for adaptive, configurable QoS systems and methods in a tactical data network.

BRIEF SUMMARY OF THE INVENTION

Certain embodiments of the present invention provide for a method for controlling the quality of service for data communication. The method includes receiving a receiving a first data set and a second data set and storing the first data set in a queue. The method also includes determining whether the content of the first data set is functionally redundant to the content of the second data set. The method also includes transmitting the first data set and dropping the second data set if the contents of the first data set are functionally redundant to the contents of the second data set.

Certain embodiments of the present invention provide for a computer-readable medium having a set of instructions for execution on a processing device. The set of instructions includes a receiving routine for receiving a first data set and a second data set. The set of instructions also includes a storing routine for storing the first data set in a queue. The set of instructions also includes a redundancy routine for determining whether the content of the first data set is functionally redundant to the content of the second data set. The set of instructions also includes a transmitting routine for transmitting the first data set and dropping the second data set if the contents of the first data set are functionally redundant to the contents of the second data set.

Certain embodiments of the present invention provide for a method for data communication. The method includes receiving a first data set and storing the first data set in a queue. The method also includes receiving a second data set. Next, the method includes determining whether to perform functional redundancy processing for the second data set based on redundancy rules. The redundancy rules may be controlled by a selected mode. Next, the method includes searching the queue for the first data set and determining whether the first data set is functionally redundant to the second data set based on the redundancy rules. If the first data set is functionally redundant to the second data set, the second data set is dropped.

BRIEF DESCRIPTION OF SEVERAL VIEWS OF THE DRAWINGS

FIG. 9 illustrates a method in accordance with an embodiment of the present invention.

Figure 1:
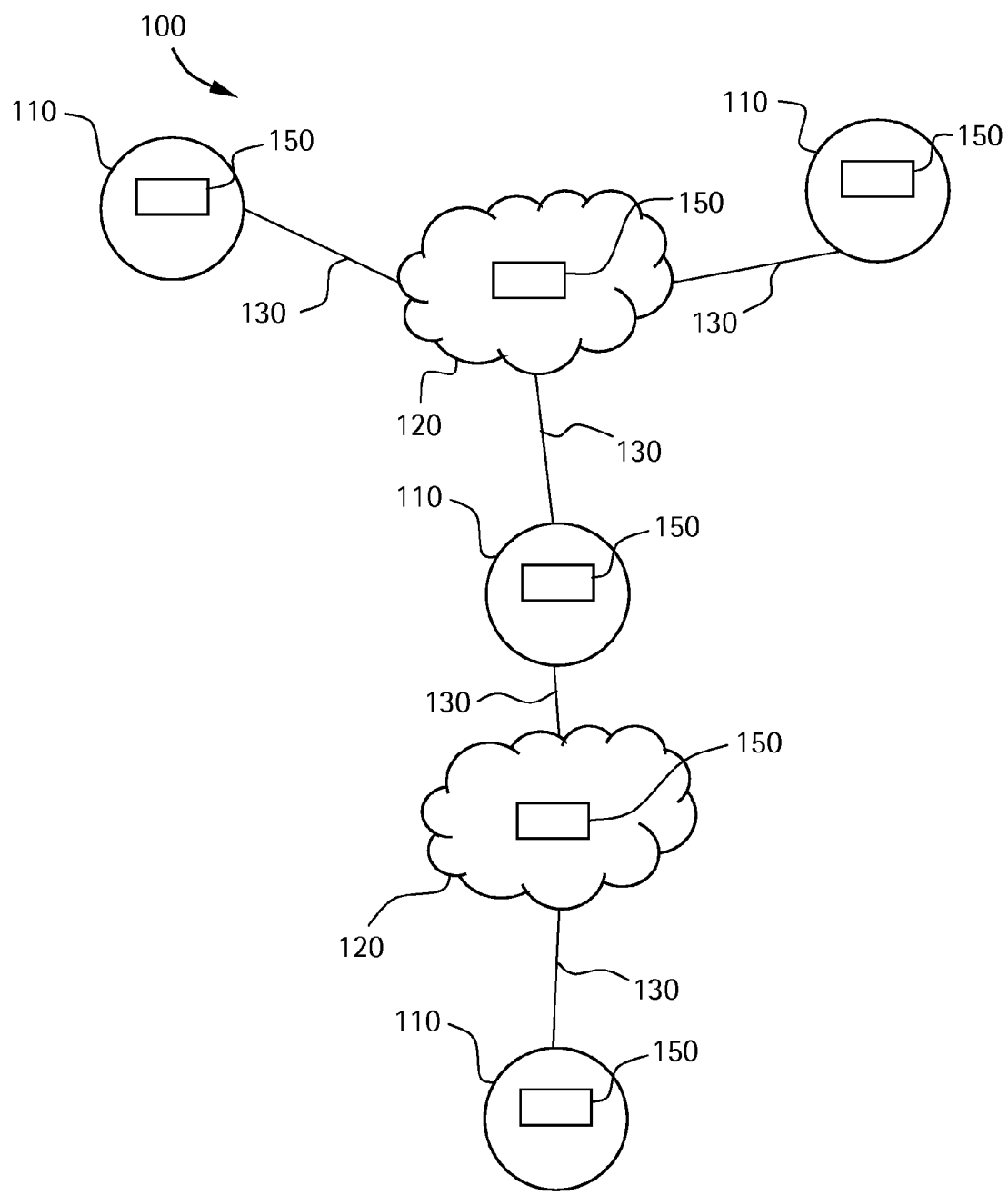
FIG. 1 illustrates a tactical communications network environment operating with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a tactical communications network environment 100 operating with an embodiment of the present invention. The network environment 100 includes a plurality of communication nodes 110, one or more networks 120, one or more links 130 connecting the nodes and network(s), and one or more communication systems 150 facilitating communication over the components of the network environment 100. The following discussion assumes a network environment 100 including more than one network 120 and more than one link 130, but it should be understood that other environments are possible and anticipated.

Communication nodes 110 may be and/or include radios, transmitters, satellites, receivers, workstations, servers, and/or other computing or processing devices, for example.

Network(s) 120 may be hardware and/or software for transmitting data between nodes 110, for example. Network(s) 120 may include one or more nodes 110, for example.

Link(s) 130 may be wired and/or wireless connections to allow transmissions between nodes 110 and/or network(s) 120.

The communications system 150 may include software, firmware, and/or hardware used to facilitate data transmission among the nodes 110, networks 120, and links 130, for example. As illustrated in FIG. 1, communications system 150 may be implemented with respect to the nodes 110, network(s) 120, and/or links 130. In certain embodiments, every node 110 includes a communications system 150. In certain embodiments, one or more nodes 110 include a communications system 150. In certain embodiments, one or more nodes 110 may not include a communications system 150.

Figure 2:
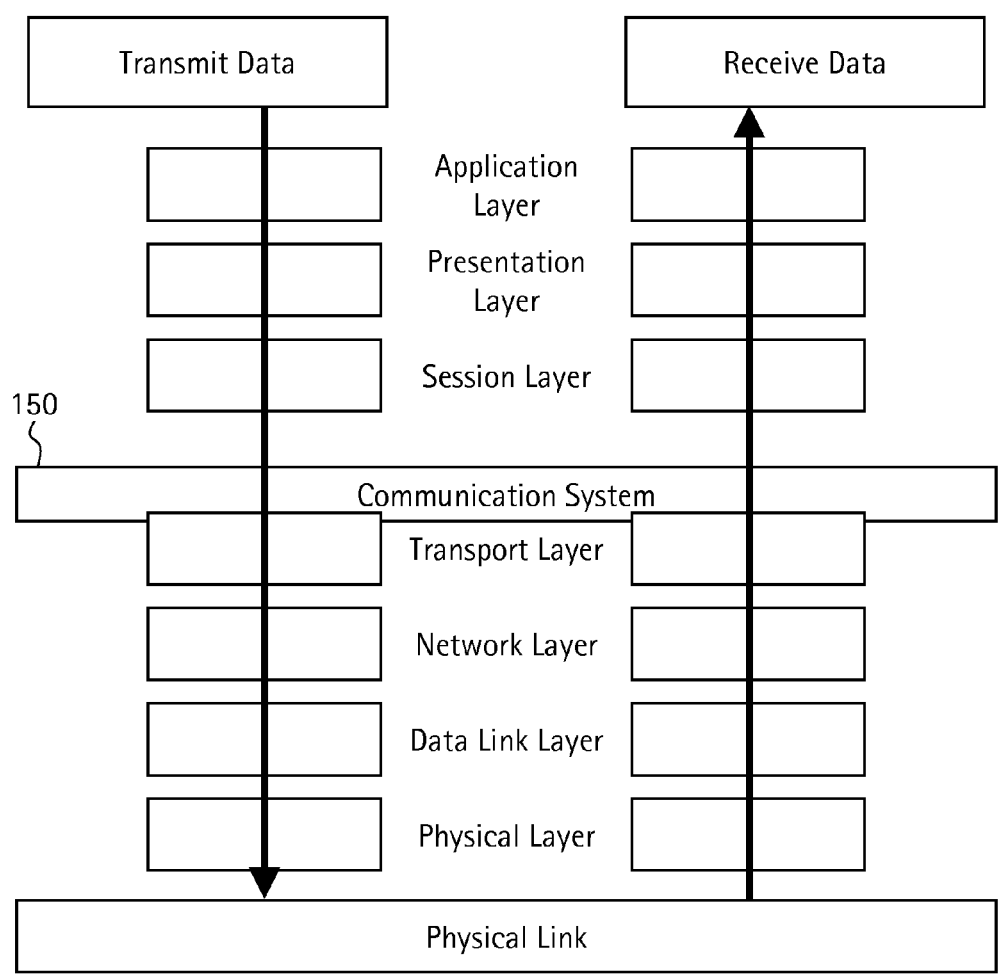
FIG. 2 shows the positioning of the data communications system in the seven layer OSI network model in accordance with an embodiment of the present invention.
Figure 3:
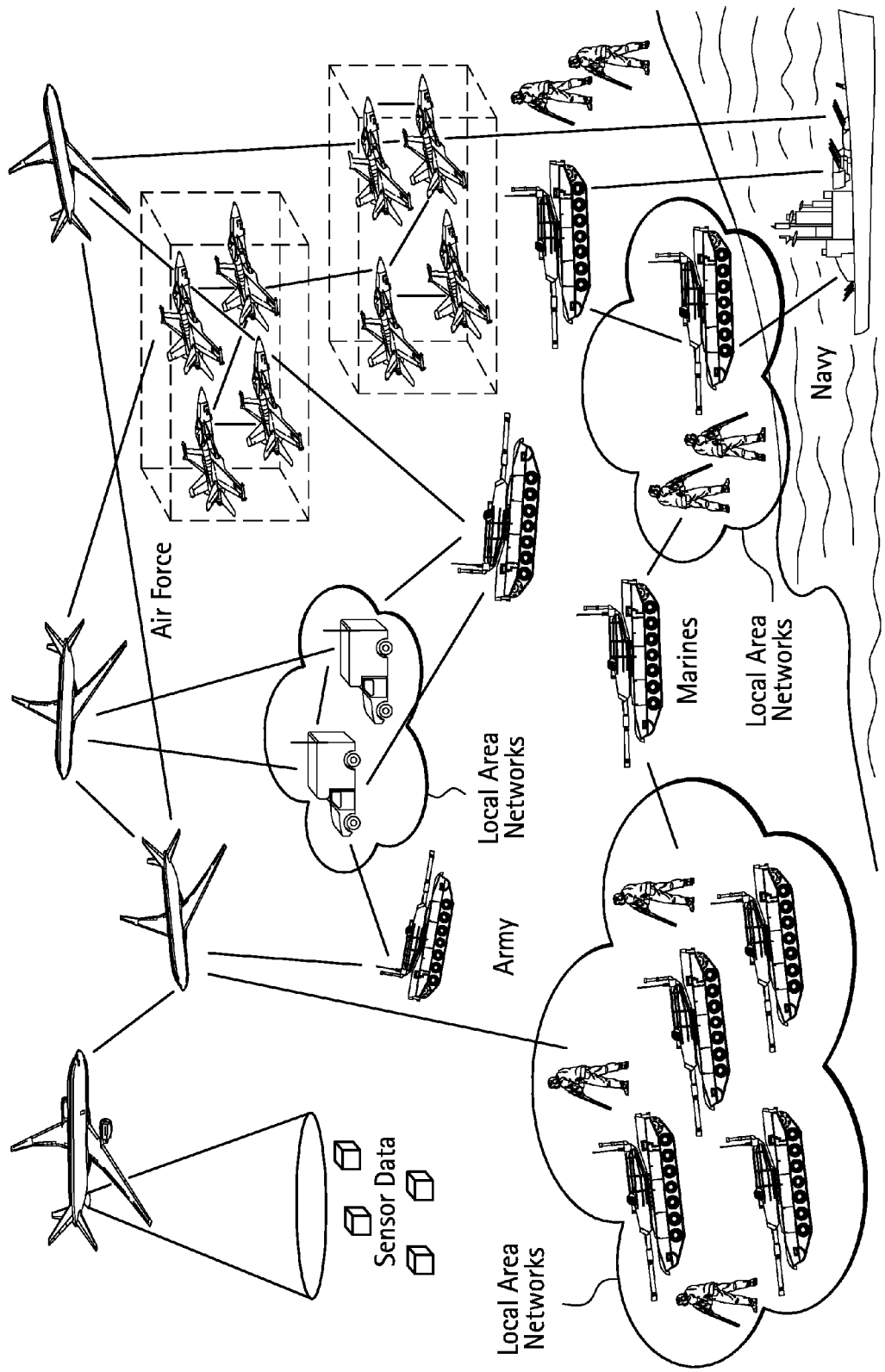
FIG. 3 depicts an example of multiple networks facilitated using the data communications system in accordance with an embodiment of the present invention.

The communication system 150 provides dynamic management of data to help assure communications on a tactical communications network, such as the network environment 100. As shown in FIG. 2, in certain embodiments, the system 150 operates as part of and/or at the top of the transport layer in the OSI seven layer protocol model. The system 150 may give precedence to higher priority data in the tactical network passed to the transport layer, for example. The system 150 may be used to facilitate communications in a single network, such as a local area network (LEAN) or wide area network (WAN), or across multiple networks. An example of a multiple network system is shown in FIG. 3. The system 150 may be used to manage available bandwidth rather than add additional bandwidth to the network, for example.

In certain embodiments, the system 150 is a software system, although the system 150 may include both hardware and software components in various embodiments. The system 150 may be network hardware independent, for example. That is, the system 150 may be adapted to function on a variety of hardware and software platforms. In certain embodiments, the system 150 operates on the edge of the network rather than on nodes in the interior of the network. However, the system 150 may operate in the interior of the network as well, such as at "choke points" in the network.

The system 150 may use rules and modes or profiles to perform throughput management functions such as optimizing available bandwidth, setting information priority, and managing data links in the network. Optimizing bandwidth usage may include removing functionally redundant messages, message stream management or sequencing, and message compression, for example. By "optimizing" bandwidth, it is meant that the presently described technology can be employed to increase an efficiency of bandwidth use to communicate data in one or more networks. Setting information priority may include differentiating message types at a finer granularity than Internet Protocol (IP) based techniques and sequencing messages onto a data stream via a selected rule-based sequencing algorithm, for example. Data link management may include rule-based analysis of network measurements to affect changes in rules, modes, and/or data transports, for example. A mode or profile may include a set of rules related to the operational needs for a particular network state of health or condition. The system 150 provides dynamic, "on-the-fly" reconfiguration of modes, including defining and switching to new modes on the fly.

The communication system 150 may be configured to accommodate changing priorities and grades of service, for example, in a volatile, bandwidth-limited network. The system 150 may be configured to manage information for improved data flow to help increase response capabilities in the network and reduce communications latency. Additionally, the system 150 may provide interoperability via a flexible architecture that is upgradeable and scalable to improve availability, survivability, and reliability of communications. The system 150 supports a data communications architecture that may be autonomously adaptable to dynamically changing environments while using predefined and predictable system resources and bandwidth, for example.

In certain embodiments, the system 150 provides throughput management to bandwidth-constrained tactical communications networks while remaining transparent to applications using the network. The system 150 provides throughput management across multiple users and environments at reduced complexity to the network. As mentioned above, in certain embodiments, the system 150 runs on a host node in and/or at the top of layer four (the transport layer) of the OSI seven layer model and does not require specialized network hardware. The system 150 may operate transparently to the layer four interface. That is, an application may utilize a standard interface for the transport layer and be unaware of the operation of the system 150. For example, when an application opens a socket, the system 150 may filter data at this point in the protocol stack. The system 150 achieves transparency by allowing applications to use, for example, the TCP/IP socket interface that is provided by an operating system at a communication device on the network rather than an interface specific to the system 150. System 150 rules may be written in extensible markup language (XML) and/or provided via custom dynamic link libraries (DLLs), for example.

In certain embodiments, the system 150 provides quality of service (QoS) on the edge of the network. The system's QoS capability offers content-based, rule-based data prioritization on the edge of the network, for example. Prioritization may include differentiation and/or sequencing, for example. The system 150 may differentiate messages into queues based on user-configurable differentiation rules, for example. The messages are sequenced into a data stream in an order dictated by the user-configured sequencing rule (e.g., starvation, round robin, relative frequency, etc.). Using QoS on the edge, data messages that are indistinguishable by traditional QoS approaches may be differentiated based on message content, for example. Rules may be implemented in XML, for example. In certain embodiments, to accommodate capabilities beyond XML and/or to support extremely low latency requirements, the system 150 allows dynamic link libraries to be provided with custom code, for example.

Inbound and/or outbound data on the network may be customized via the system 150. Prioritization protects client applications from high-volume, low-priority data, for example. The system 150 helps to ensure that applications receive data to support a particular operational scenario or constraint.

In certain embodiments, when a host is connected to a LAN that includes a router as an interface to a bandwidth-constrained tactical network, the system may operate in a configuration known as QoS by proxy. In this configuration, packets that are bound for the local LAN bypass the system and immediately go to the LAN. The system applies QoS on the edge of the network to packets bound for the bandwidth-constrained tactical link.

In certain embodiments, the system 150 offers dynamic support for multiple operational scenarios and/or network environments via commanded profile switching. A profile may include a name or other identifier that allows the user or system to change to the named profile. A profile may also include one or more identifiers, such as a functional redundancy rule identifier, a differentiation rule identifier, an archival interface identifier, a sequencing rule identifier, a pre-transmit interface identifier, a post-transmit interface identifier, a transport identifier, and/or other identifier, for example. A functional redundancy rule identifier specifies a rule that detects functional redundancy, such as from stale data or substantially similar data, for example. A differentiation rule identifier specifies a rule that differentiates messages into queues for processing, for example. An archival interface identifier specifies an interface to an archival system, for example. A sequencing rule identifier identifies a sequencing algorithm that controls samples of queue fronts and, therefore, the sequencing of the data on the data stream. A pre-transmit interface identifier specifies the interface for pre-transmit processing, which provides for special processing such as encryption and compression, for example. A post-transmit interface identifier identifies an interface for post-transmit processing, which provides for processing such as de-encryption and decompression, for example. A transport identifier specifies a network interface for the selected transport.

A profile may also include other information, such as queue sizing information, for example. Queue sizing information identifiers a number of queues and amount of memory and secondary storage dedicated to each queue, for example.

In certain embodiments, the system 150 provides a rules-based approach for optimizing bandwidth. For example, the system 150 may employ queue selection rules to differentiate messages into message queues so that messages may be assigned a priority and an appropriate relative frequency on the data stream. The system 150 may use functional redundancy rules to manage functionally redundant messages. A message is functionally redundant if it is not different enough (as defined by the rule) from a previous message that has not yet been sent on the network, for example. That is, if a new message is provided that is not sufficiently different from an older message that has already been scheduled to be sent, but has not yet been sent, the newer message may be dropped, since the older message will carry functionally equivalent information and is further ahead in the queue. In addition, functional redundancy many include actual duplicate messages and newer messages that arrive before an older message has been sent. For example, a node may receive identical copies of a particular message due to characteristics of the underlying network, such as a message that was sent by two different paths for fault tolerance reasons. As another example, a new message may contain data that supersedes an older message that has not yet been sent. In this situation, the system 150 may drop the older message and send only the new message. The system 150 may also include priority sequencing rules to determine a priority-based message sequence of the data stream Additionally, the system 150 may include transmission processing rules to provide pre-transmission and post-transmission special processing, such as compression and/or encryption.

In certain embodiments, the system 150 provides fault tolerance capability to help protect data integrity and reliability. For example, the system 150 may use user-defined queue selection rules to differentiate messages into queues. The queues are sized according to a user-defined configuration, for example. The configuration specifies a maximum amount of memory a queue may consume, for example. Additionally, the configuration may allow the user to specify a location and amount of secondary storage that may be used for queue overflow. After the memory in the queues is filled, messages may be queued in secondary storage. When the secondary storage is also full, the system 150 may remove the oldest message in the queue, logs an error message, and queues the newest message. If archiving is enabled for the operational mode, then the de-queued message may be archived with an indicator that the message was not sent on the network.

Memory and secondary storage for queues in the system 150 may be configured on a per-link basis for a specific application, for example. A longer time between periods of network availability may correspond to more memory and secondary storage to support network outages. The system 150 may be integrated with network modeling and simulation applications, for example, to help identify sizing to help ensure that queues are sized appropriately and time between outages is sufficient to help achieve steady-state and help avoid eventual queue overflow.

Furthermore, in certain embodiments, the system 150 offers the capability to meter inbound ("shaping") and outbound ("policing") data. Policing and shaping capabilities help address mismatches in timing in the network. Shaping helps to prevent network buffers form flooding with high-priority data queued up behind lower-priority data. Policing helps to prevent application data consumers from being overrun by low-priority data. Policing and shaping are governed by two parameters: effective link speed and link proportion.

The system 150 may from a data stream that is no more than the effective link speed multiplied by the link proportion, for example. The parameters may be modified dynamically as the network changes. The system may also provide access to detected link speed to support application level decisions on data metering. Information provided by the system 150 may be combined with other network operations information to help decide what link speed is appropriate for a given network scenario.

Figure 4:
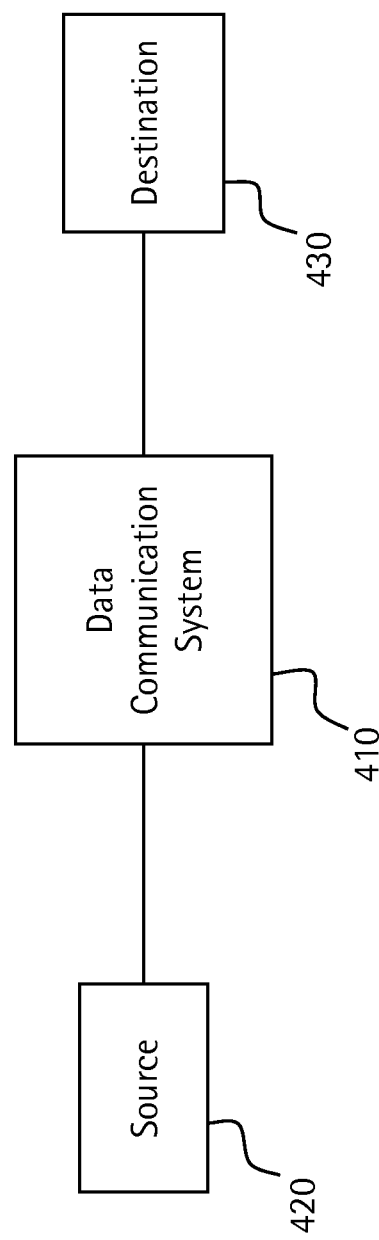
FIG. 4 illustrates a data communication environment operating with an embodiment of the present invention.

FIG. 4 illustrates a data communication environment 400 operating with an embodiment of the present invention. The environment 400 includes one or more source nodes 420, a data communication system 410, and one or more destination nodes 430. The data communication system 410 is in communication with the source node(s) 420 and the destination node(s) 430. The data communication system 410 may communicate with the source node(s) 420 and/or destination node(s) 430 over links, such as wire, radio, satellite, network links, and/or through inter-process communication, for example. In certain embodiments, the data communication system 410 may communicate with one or more source nodes 420 and/or destination nodes 430 over one or more tactical data networks. The components of the system 400 may be single units, separate units, may be integrated in various forms, and may be implemented in hardware and/or in software.

The data communication system 410 may be similar to the communication system 150, described above, for example. In certain embodiments, the data communication system 410 is adapted to receive data from the one or more source nodes 420. In certain embodiments, the data communication system 410 may include a memory unit and/or data base for storing computer instructions and rules. The data communication system 410 may also include a processor for processing data, rules, and instructions. In certain embodiments, the data communication system 410 may include one or more queues for storing, organizing, and/or prioritizing the data. Alternatively, other data structures may be used for storing, organizing, and/or prioritizing the data. For example, a table, tree, or linked list may be used. In certain embodiments, the data communication system 410 is adapted to communicate data to the one or more destination nodes 430.

In certain embodiments, the data communication system 410 is transparent to other applications. For example, the processing, organizing, and/or prioritization performed by the data communication system 410 may be transparent to one or more source nodes 420 or other applications or data sources. For example, an application running on the same system as data communication system 410, or on a source node 420 connected to the data communication system 410, may be unaware of the prioritization of data performed by the data communication system 410.

The components, elements, and/or functionality of the data communication system 410 may be implemented alone or in combination in various forms in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

The source node 420 may include a sensor or measurement device to collect data or telemetry information. For example, the source node 420 may be a Global Positional System sensor to indicate positional data for a mobile vehicle, such as a tank, humvee unit, personal transporter, or individual solder. In another example, the source node 420 may be a photography unit, such as a video or still picture camera that acquires video or images. In another example, the source node may be a communication module, such as a radio or microphone. The destination node 430 may be any device or system interested in the data acquired by the source node 420. For example, the destination node 430 may be a receiver, a central computer system, and/or computers utilized by a command post or reconnaissance unit.

The data received, stored, prioritized, processed, communicated and/or transmitted by data communication system 410 may include a block of data. The block of data may be, for example, a packet, cell, frame, and/or stream. For example, the data communication system 410 may receive packets of data from a source node 420. As another example, the data communication system 410 may process a stream of data from a source node 420.

In certain embodiments, the data includes protocol information. The protocol information may be used by one or more protocols to communicate the data, for example. The protocol information may include, for example, a source address, a destination address, a source port, a destination port, and/or a protocol type. The source and/or destination address may be an IP address, for example, of a source node 420 and/or a destination node 430. The protocol type may include the kind of protocol used for one or more layers of communication of the data. For example, the protocol type may be a transport protocol such as Transmission Control Protocol (TCP), User Datagram Protocol (UDP), or Stream Control Transmission Protocol (SCTP). As another example, the protocol type may include Internet Protocol (IP), Internetwork Packet Exchange (IPX), Ethernet, Asynchronous Transfer Mode (ATM), File Transfer Protocol (FTP), and/or Real-time Transport Protocol (RTP). In certain embodiments, the data may also include time stamp information. The time stamp information may indicate, for example, the time of data acquisition by the source node 420.

In certain embodiments, the data includes a header and a payload. The header may include some or all of the protocol information and the time stamp information, for example. In certain embodiments, some or all of the protocol information and the time stamp information is included in the payload. For example, protocol information may include information regarding a higher-level protocol stored in the payload portion of a block of data. In certain embodiments, the data is not contiguous in memory. That is, one or more portions of the data may be located in different regions of memory. For example, protocol information may be stored in one region of memory while the payload is stored in another buffer, and the time stamp information is stored in yet another buffer.

In an embodiment, the source node 420 and the data communication system 410 may be part of the same mobile unit. A mobile unit may be a tank, humvee unit, personal transporter, individual solder, unmanned aerial vehicle (UAV), or other mobile unit. A tank may have a GPS sensor to indicate positional data as a source unit 420. The positional data may be communicated to the data communication system 410. The data communication system 410 may be located on the tank. The data communication system 410 may prepare the data for communication to the destination node 430. As part of the preparation for communication to the destination node, the data communication system 410 may execute some form of network access protocol. The network access protocol may include requesting network access from a control unit, sensing carrier availability, or other form of access control.

In an example, the network for which the data communication system 410 is attempting to acquire access may be bandwidth-constrained. In addition, one ore more links may be unreliable and/or intermittently disconnected. Accordingly, the data communication system 410 may temporarily queue data received from the source 420 until the data communication system 410 has been able to access the network to communicate the data to the destination 430. For example, the source 420 may acquire a first data set. The source 420 may communicate the first data set to the data communication system 410. The data communication system 410 may not currently have network access to transmit the first data set to the destination 430. The first data set may then be temporarily queued in a queue until the data communication system 410 has network access. The source, in the mean time, may acquire a second data set. The second data set may be communicated to the data communication system 410. The data communication system 410 may not yet have network access to transmit the first data set or the second data set to the destination 430. If the data is the type in which the timing of the data is relevant, for example the most recent data is relevant to the destination 430, such as for example positional data, the first data set is no longer relevant. In other words, the first data set has become functionally redundant in view of the second data set. Accordingly, transmission of the first data set to the destination 430 may unnecessarily consume network bandwidth.

In another example, a source may acquire a first data set and communicate the first data set to the data communication system 410. The data communication system 410 may or may not currently have network access to transmit the first data set to the destination 430. If the data communication system 410 has access to the network, the data communication system 410 may transmit the first data set to the destination 430. The source 420 may acquire a second data set. The data communication system 410 may or may not currently have network access to transmit the second data set to the destination 430. If the data communication system 410 has access to the network, the data communication system 410 may transmit the second data set to the destination 430. If the data is the type in which the time of acquisition causes the data to change a relatively small amount between consecutive acquisitions, such as for example pictures taken every second from an unmanned aerial vehicle (UAV) from 5000 ft. above ground, the consecutive data sets may be functionally redundant, in other words capturing primarily the same image. Accordingly, transmission of the consecutive data sets to the destination 430 may unnecessarily consume network bandwidth.

In another example, a source may acquire a first data set and communicate the first data set to the data communication system 410. The data communication system 410 may or may not currently have network access to transmit the first data set to the destination 430. If the data communication system 410 has access to the network, the data communication system 410 may transmit the first data set to the destination 430. The source 420 may acquire a second data set. The data communication system 410 may or may not currently have network access to transmit the second data set to the destination 430. If the data communication system 410 has access to the network, the data communication system 410 may transmit the second data set to the destination 430. If the content of the first data set is the same, and/or similar to the content of the second data set, such as a lack of an audio component in data sets that are expected to have an audio component, the consecutive data sets may be functionally redundant. Accordingly, transmission of the consecutive data sets to the destination 430 may unnecessarily consume network bandwidth.

Figure 5:
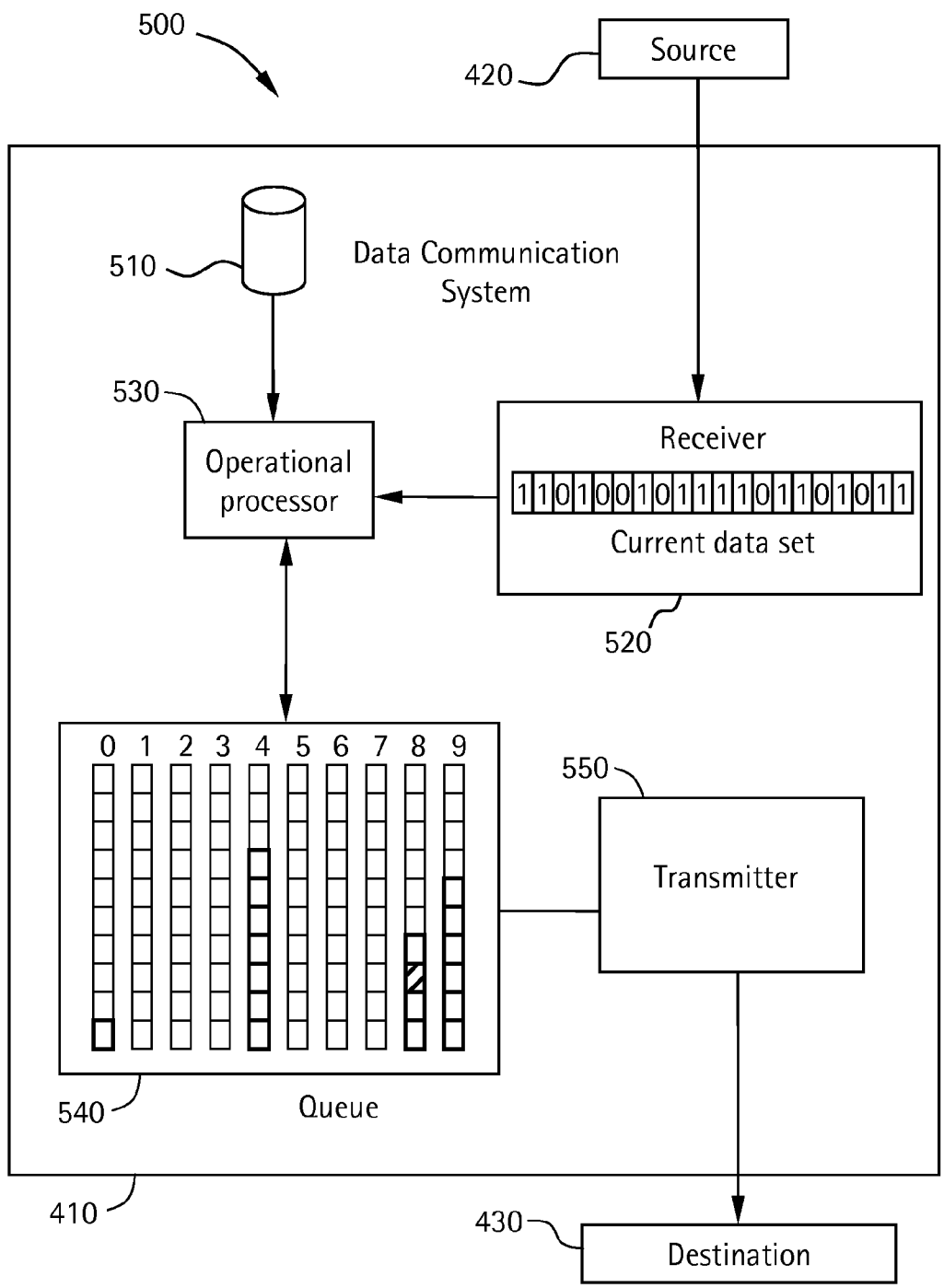
FIG. 5 illustrates a data communication environment operating with an embodiment of the present invention.

FIG. 5 illustrates a data communication environment 500 operating with an embodiment of the present invention. The environment 500 includes the data communication system 410, the source 420, and the destination 430 as shown in FIG.

4. The data communication system 410 is expanded and detailed to illustrate certain embodiments of the invention.

The data communication system 410, as shown in FIG. 5, includes a redundancy rules data base 510, a receiver 520, an operational processor 530, one or more queues 540, and a transmitter 550. The redundancy rules data base 510 is in communication with operational processor 530. The receiver 520 is in communication with the operational processor 530 and source 420. The operational processor 530 is in communication with the queue 540. The data communication system 410, as shown in FIG. 5, may communicate with the source node(s) 420 and/or destination node(s) 430 over links, such as wire, radio, satellite, network links, and/or through inter-process communication, for example. In certain embodiments, the data communication system 410 may communicate with one or more source nodes 420 and/or destination nodes 430 over one or more tactical data networks. The components of the system 500, the connections in the system 500, and the system 500, may be single units, separate units, may be integrated in various forms, and may be implemented in hardware and/or in software.

In an embodiment, the redundancy rules data base 510 may be a data base for storing and communicating various rules and/or protocol to an operational processor 530. The redundancy rules data base 510 and the connection shown between the redundancy rules data base 510 and the operational processor 530 is representative of various components and/or software for performing operations and storing rules and instructions. The receiver 520 is representative of various components and/or software for receiving data from the source 420. The operational processor 530 is representative of a processor for processing data and performing operations based on rules communicated by the redundancy rules data base 510. The queue 540 is representative of various components and/or software for queuing data. The transmitter 550 is representative of various components and/or software for transmitting data to destination 430.

As discussed above, the data received, stored, prioritized, processed, communicated, and/or transmitted by data communication system 410 may include a block of data. The block of data may be, for example, a packet, cell, frame, and/or stream. For example, the receiver 520 is shown having a block of data. A data set may include a single block of data, or a plurality of blocks of data.

In certain embodiments, the data includes protocol information. The protocol information may be used by one or more protocols to communicate the data, for example. The protocol information may include, for example, a source address, a destination address, a source port, a destination port, and/or a protocol type. The source and/or destination address may be an IP address, for example, of a source node 420 and/or a destination node 430. The protocol type may include the kind of protocol used for one or more layers of communication of the data. For example, the protocol type may be a transport protocol such as Transmission Control Protocol (TCP), User Datagram Protocol (UDP), or Stream Control Transmission Protocol (SCTP). As another example, the protocol type may include Internet Protocol (IP), Internetwork Packet Exchange (IPX), Ethernet, Asynchronous Transfer Mode (ATM), File Transfer Protocol (FTP), and/or Real-time Transport Protocol (RTP). In certain embodiments, the data may also include time stamp information. The time stamp information may indicate, for example, the time of data acquisition by the source node 420.

In certain embodiments, the data includes a header and a payload. The header may include some or all of the protocol information and the time stamp information, for example. In certain embodiments, some or all of the protocol information and the time stamp information is included in the payload. For example, protocol information may include information regarding a higher-level protocol stored in the payload portion of a block of data. In certain embodiments, the data is not contiguous in memory. That is, one or more portions of the data may be located in different regions of memory. For example, protocol information may be stored in one region of memory while the payload is stored in another buffer, and the time stamp information is stored in yet another buffer.

In operation, a data set may be provided and/or generated by one or more data sources 420. The data set is received at the receiver 520. The data set may be received over one or more links, for example. For example, the data set may be received at the data communication system 410 from a radio over a tactical data network. As another example, a data set may be provided to the data communication system 410 by an application running on the same system by an inter-process communication mechanism. As discussed above, a data set may include a single block of data, or a plurality of blocks of data.

In certain embodiments, the receiver 520 may communicate the data set to an operational processor 530. The operational processor 530 may receive the data set and determine whether to perform functional redundancy processing on the data set. The operational processor 530 may base the determination whether to perform functionally redundant processing on the data set on redundancy rules from the redundancy rules data base 510.

In an embodiment, the redundancy rules may be rules that control whether to perform functional redundancy processing on a particular data set, and if functional redundancy processing is to be performed, how to perform the functional redundancy processing. The mode, as selected by a user or selected by computer software based on various factors, may define "sets" of redundancy rules applicable to the data set.

For example, the redundancy rules may be set as either "on" or "off" based the "mode" selected by a user. As discussed above, the data communications system 410 may use rules and modes or profiles to perform throughput management functions such as optimizing available bandwidth, setting information priority, and managing data links in the network. The different modes may affect changes in rules, modes, and/or data transports, for example. A mode or profile may include a set of rules related to the operational needs for a particular network state of health or condition. The data communication system 410 may provide dynamic reconfiguration of modes, including defining and switching to new modes "on-the fly" or selection of a mode by a user, for example.

If the selected mode utilizes a set of redundancy rules, then the operational processor 530 may analyze the data set to determine whether to perform functional redundancy processing based on the redundancy rules. In an embodiment, the available modes may have different redundancy rules. For example, mode A may have a first set of redundancy rules and mode B may have a second set of redundancy rules. A set of redundancy rules may belong to a single mode, or a plurality of modes. A mode may include more than one set of redundancy rules.

In determining whether to perform functional redundancy processing, the operational processor 530 may read information from the data block, such as the protocol information, payload, and/or time stamp of the data block. As discussed above, the protocol information may include, for example, a source address, a destination address, a source port, a destination port, a protocol type and/or a time stamp. If, for example, the redundancy rules in the redundancy rules data base 510, for the selected mode, indicate that functional redundancy should be performed for data from a particular source, then the operational processor 530 performs functional redundancy processing for data from the particular source. For example, the redundancy rules of the selected mode may indicate to perform functional redundancy processing for data from source node A, but not for data from source node B. Accordingly, functional redundancy processing would not be preformed for data from source node B in this example.

If the operational processor 530 determines that functional redundancy processing should be performed on the data set, the operational processor 530 may perform functional redundancy processing on the data set according to the redundancy rules. The redundancy rules may be determined by the selected mode. For example, the redundancy rules may dictate that the operational processor 530 search the queue 540 for a data set that originates from the same source as the current data set. The redundancy rules may dictate that if an older data set is found in the queue from a particular source, the older data set is functionally redundant to the current, newer, data set. Alternatively, the redundancy rules may dictate that the operational processor 530 search the queue 540 for a data set that originates from the same source as the current data set. The redundancy rules may instruct the operational processor to review the time stamp information of the queued data set and the current data set to determine if the queued data set and the current data set contain functionally redundant information. In another alternative, the redundancy rules may instruct the operational process to review the payload information to determine if the queued data set and the current data set have similar and/or the same functional contents and thus functionally redundant.

For example, the redundancy rules may identify a first, earlier data set as functionally redundant to a second, later data set if the first data set and second data set are acquired from the same source. In another example, the redundancy rules may identify a first, earlier data set as functionally redundant to a second, later data set if the first data set and second data set were acquired with less than a predetermined time period between the first data set and second data set. In another example, the redundancy rules may identify a second, later data set as functionally redundant to a first, earlier data set if the first data set and second data set have a functionally similar and/or the same content, such as a lack of an audio component in a data set expected to have an audio component, for example.

An example of data that may be classified as functionally redundant may be positional data. A source 420, for example a GPS indicator, may generate a first data set for reporting the position of a humvee at a particular time. Due to network constraints, the first data set may be stored in the queue 540. As the humvee may be moving, the source 420 may generate a second data set reporting a different position from the first data set. When the operational processor 530 receives the second data set, the operational processor 530 may determine that the selected mode utilizes functional redundancy for positional data from the source 420.

The operational processor 530 may then search the queue 540 to determine if a data set from the source 420 is stored in the queue 540. If a data set from the source 420 is located, the operational processor 530 may determine that the first data set of positional data is functionally redundant to the second data set of positional data. The operational processor 530 may drop the earlier first data set of positional data from the queue 540, as the first data set of positional data, acquired earlier in time, is now less accurate than the second data set, acquired later in time, of positional data. The operational processor 530 may then add the second data set of positional data to the queue 540.

The operational processor 530 may add the second data set to the queue 540 such that the order of transmission of the queue 540 is unchanged. For example, the second data set may replace the first data set in the location of the queue. In an embodiment, the spot in the queue is preserved as the first data set is replaced by the second data set. In another embodiment, the second data set is added to the end of the queue. The operational processor 530 may add the second data set to the queue 540 in a first-in-first-out protocol. In such a manner, the most recent positional data is sent to the destination 430 without burdening the network with positional data that is "old" and no longer accurate nor relevant.

Another example of data that may be classified as functionally redundant may be consecutive data sets acquired over a short period of time. For example, an unmanned aerial vehicle (UAV) may be flying at 5000 feet and snapping one picture per second. The UAV may be flying relatively slowly, so the pictures taken by the UAV are not substantially different from one another other. As consecutive pictures taken over a short period of time may not illustrate new information, the consecutive pictures may be functionally redundant. Transmitting the functionally redundant pictures may unnecessarily consume valuable bandwidth.

In an example provided for better understanding, a UAV may capture a first picture (first data set in this example) from a camera (the source 420 in this example), and communicate the first picture to the receiver 520. The receiver 520 may communicate the first picture to the operational processor 530. The operational processor 530 may communicate the first picture to the queue 540. The first picture may wait in the queue 540 until the transmitter 550 has network access. In certain embodiments, the transmitter 550 may not have network access, or may not request network access, before a second picture (second data set in this example) from the camera (the source 420 in this example) is communicated to the operational processor 530.

The operational processor 530, upon receiving the second data set, determines whether to perform functional redundancy processing on the second data set. As discussed above, the operational processor 530 may read information from the data block, such as the protocol information, payload, and/or time stamp of the data block. The protocol information may include, for example, a source address, a destination address, a source port, a destination port, a protocol type and/or a time stamp. When the operational processor 530 receives the second data set, the operational processor 530 may determine that the selected mode utilizes functional redundancy for data from the source 420 (camera on the UAV in this example) according to redundancy rules. For example, the redundancy rules may specify that a time threshold separate data sets transmitted to the destination 430 from the source 420.

The operational processor 530 may search the queue 540 to determine if a data set from the source 420 is stored in the queue 540. If a data set from the source 420 is located, the operational processor 530 may review the time stamp of the first data set and the time stamp of the second data set. The operational processor 530 may determine that the difference in acquisition time, as identified in the time stamps, between the first data set and the second data set is less than a particular time threshold. If the difference between the acquisition time of the first data set and the second data set is less than a particular time threshold, the operational processor 540 may determine that the first data set is functionally redundant to the second data set. The time threshold value may be determined by the selected mode.

In an embodiment, the operational processor 530 may drop the earlier first data set (first picture) from the queue 540, as the first data set, acquired earlier in time, is now less relevant than the second data set (second picture), acquired later in time. The operational processor 530 may then add the second data set (second picture) to the queue 540. The operational processor 530 may add the second data set to the queue 540 such that the order of transmission of the queue 540 is unchanged. For example, the second data set may replace the first data set in the location of the queue. In an embodiment, the spot in the queue is preserved as the first data set is replaced by the second data set. In another embodiment, the second data set is added to the end of the queue. The operational processor 530 may add the second data set to the queue 540 in a first-in-first-out protocol.

Another example of data that may be classified as functionally redundant may be data sets having the same or similar content. If the content of the first data set is the same, and/or similar to the content of the second data set, such as a lack of an audio component in data sets that are expected to have an audio component, the consecutive data sets may be functionally redundant. For example, data sets expected to contain audio data that do not contain audio data may indicate that the data set is transmitting radio silence. If radio silence is not useful information to the destination 430, transmitting data sets containing radio silence may unnecessarily consume bandwidth. Accordingly, consecutive data sets having little or no audio component, for data sets where an audio component is expected, may be functionally redundant.

In an example provided for better understanding, a radio or microphone (the source 420 in this example) may acquire a first data set and communicate the first data set to the receiver 520. The receiver 520 may communicate the first data set to the operational processor 530. The operational processor 530 may communicate the first data set to the queue 540. The first data set may wait in the queue 540 until the transmitter 550 has network access. In certain embodiments, the transmitter 550 may not have network access, or may not request network access, before a second data set is communicated to the operational processor 530 from the source 420.

The operational processor 530, upon receiving the second data set, determines whether to perform functional redundancy processing on the second data set. As discussed above, the operational processor 530 may read information from the data block, such as the protocol information, payload, and/or time stamp of the data block. The protocol information may include, for example, a source address, a destination address, a source port, a destination port, a protocol type and/or a time stamp. When the operational processor 530 receives the second data set, the operational processor 530 may determine that the selected mode utilizes functional redundancy for data from the source 420 (a radio microphone in this example) according to the redundancy rules. For example, the redundancy rules may specify that an audio component be present in data payload from the source 420.

The operational processor 530 may search the queue 540 to determine if a data set from the source 420 is stored in the queue 540. If a data set from the source 420 is located, the operational processor 530 may review the payload of the first data set at the expected location of the audio component. The operational processor 530 may also review the payload of the second data set at the expected location of the audio component. The operational processor 530 may determine that the first data set does not contain an audio component and the second data set does not contain an audio component. If the first data set and the second data set both do not have an audio component, and both data sets are expected to have an audio component, transmitting both the first and second data sets does not communicate useful information to the destination 430. Accordingly, the operational processor 540 may determine that the first data set is functionally redundant to the second data set or that the second data set is functionally redundant to the first data set.

In an embodiment, the operational processor 530 may drop the earlier first data set from the queue 540. The operational processor 530 may then add the second data set to the queue 540. The operational processor 530 may add the second data set to the queue 540 such that the order of transmission of the queue 540 is unchanged. For example, the second data set may replace the first data set in the location of the queue. In an embodiment, the spot in the queue is preserved as the first data set is replaced by the second data set. In another embodiment, the second data set is added to the end of the queue. Alternatively, the operational processor 530 may add the second data set to the queue 540 in a first-in-first-out protocol.

In another embodiment, the operational processor 530 may drop the later, second data set and leave the first data set in the queue 540. In an embodiment, it may be more efficient for the operational processor 530 to drop the second data set rather than add the second data set to the queue and drop the first data set. In the embodiment where the first data set and the second data set generally contain similar and/or the same content, the system 500 may be generally indifferent on selecting either the first data set or the second data set for transmission. Other factors being substantially equal, the operational processor 530 may operate more efficiently to transmit the first data set and delete the second data set for certain data.

The above examples of functional redundancy are only examples. The redundancy rules may be crafted to define redundant data based on source, time, payload, or other factors. The redundancy rules may be applicable to a single mode or multiple modes. A mode may utilize a single set of redundancy rules or multiple sets of redundancy rules.

Figure 6:
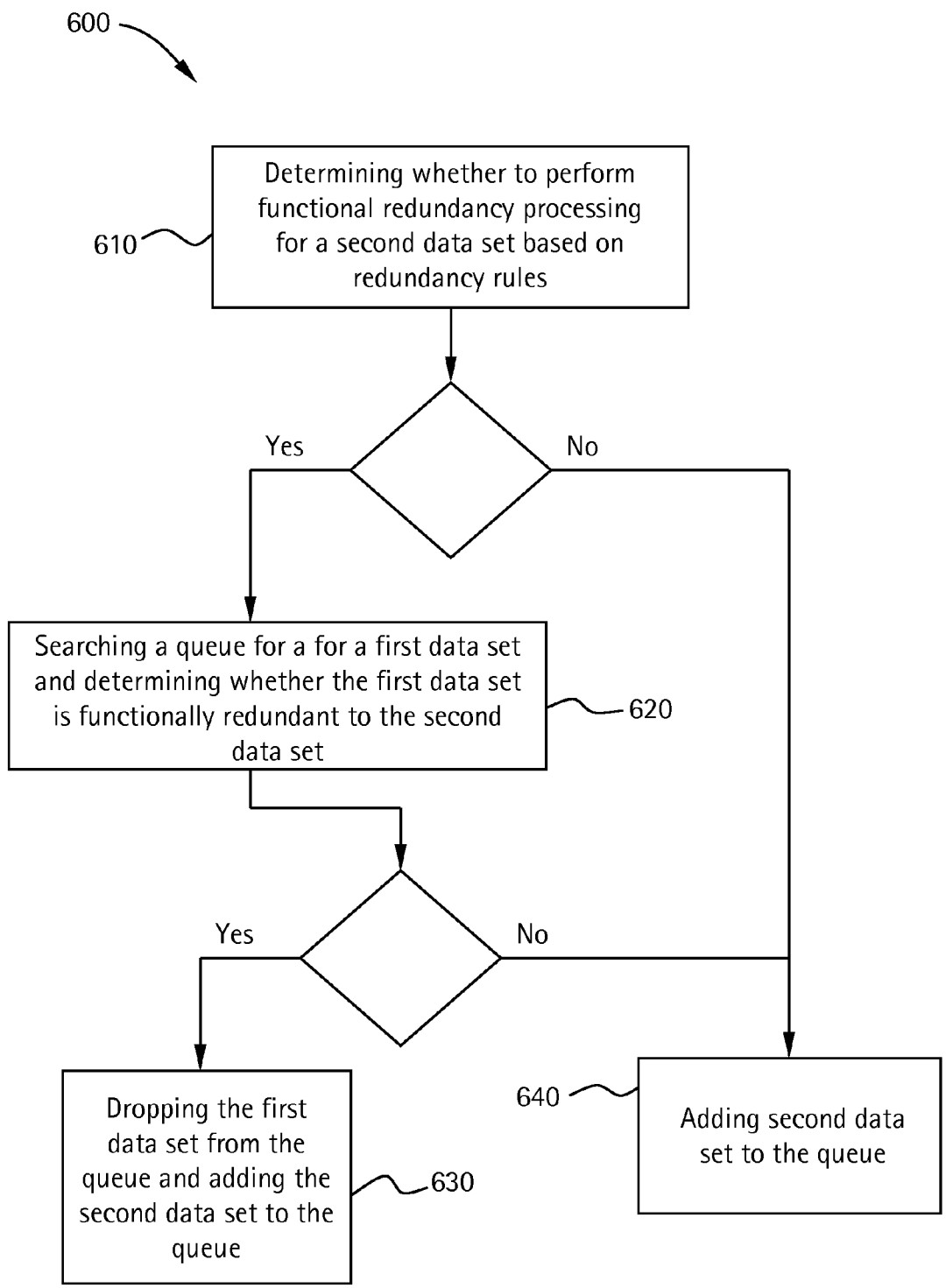
FIG. 6 illustrates a flow diagram in accordance with an embodiment of the present invention.

FIG. 6 illustrates a flow diagram 600 for the operational processor 530 in accordance with an embodiment of the present invention. At step 610, a first data set has been received and stored in the queue 540. A second data set has been received and communicated to the operational processor 530. The data communication system 410 is in a mode that utilizes functional redundancy for data from the source 420. The second data set is operated upon by the operational processor 530. The operations by the operational processor 530 may include determining whether to perform functional redundancy processing for the second data set based on the redundancy rules from the redundancy rules data base 510, as governed by the selected mode. For example, the operational processor 530 may read information from the second data set, such as the protocol information, payload, and/or time stamp of the data set. As discussed above, the protocol information may include, for example, a source address, a destination address, a source port, a destination port, a protocol type and/or a time stamp. If, for example, the redundancy rules in the redundancy rules data base 510, for the selected mode, indicate that functional redundancy should be performed for the current data set, then the operational processor performs functional redundancy processing.

If the redundancy rules dictate that functional redundancy processing is to be performed, the flow diagram indicating the functionality of the operational processor 530, moves on to step 620. If the functional redundancy rules dictate that functional redundancy processing is not to be performed, then the operational processor 530 (flow diagram) moves on to step 640 and adds the second data set to the queue 540. In an embodiment, the spot in the queue is preserved as the first data set is replaced by the second data set. In another embodiment, the second data set is added to the end of the queue. Once the second data set has been added to the queue 540, the second data set awaits transmission to the destination 430.

At step 620, the operational processor 530 searches the queue 540 according to the redundancy rules. In an embodiment, the operational processor 530 searches the queue 540 for a first data set that is functionally redundant to the second data set. As explained above, the operational processor determines whether a first data set is functionally redundant to the second data set based on the rules in the redundancy rules data base 510, as dictated by the selected mode. As an example, the operational processor 530 may decide that the first data set is functionally redundant to the second data set if the first and second data sets originate from the same source. As another example, the operational processor 530 may decide that the first data set is functionally redundant to the second data set if the first and second data sets originate from the same source and the difference between the time stamps is not greater than a predetermined threshold. As yet another example, the operational processor 530 may decide that the first data set is functionally redundant to the second data set if the first and second data sets have a common element that may not be useful to transmit to the destination 430 multiple times.

If, at step 620, the operational processor 530 locates functionally redundant data in the queue 540, the operational processor 530 moves on to step 630. If, at step 630, the operational processor does not locate functionally redundant data in the queue 540, the operational processor 530 moves on to step 640 and adds the second data set to the queue 540 to await transmission.

At step 630, the operational processor 530 may drop the earlier first data set of from the queue 540. The operational processor 530 may then add the later second data set to the queue 540. In an embodiment, the operational processor 530 may add the second data set to the queue 540 such that the order of transmission of the queue 540 is unchanged. In an embodiment, the spot in the queue is preserved as the first data set is replaced by the second data set. In another embodiment, the second data set is added to the end of the queue. The operational processor 530 may add the second data set to the queue 540 in a first-in-first-out protocol. The steps of the flow diagram 600 may execute repeatedly in order to utilize bandwidth efficiently.

Figure 7:
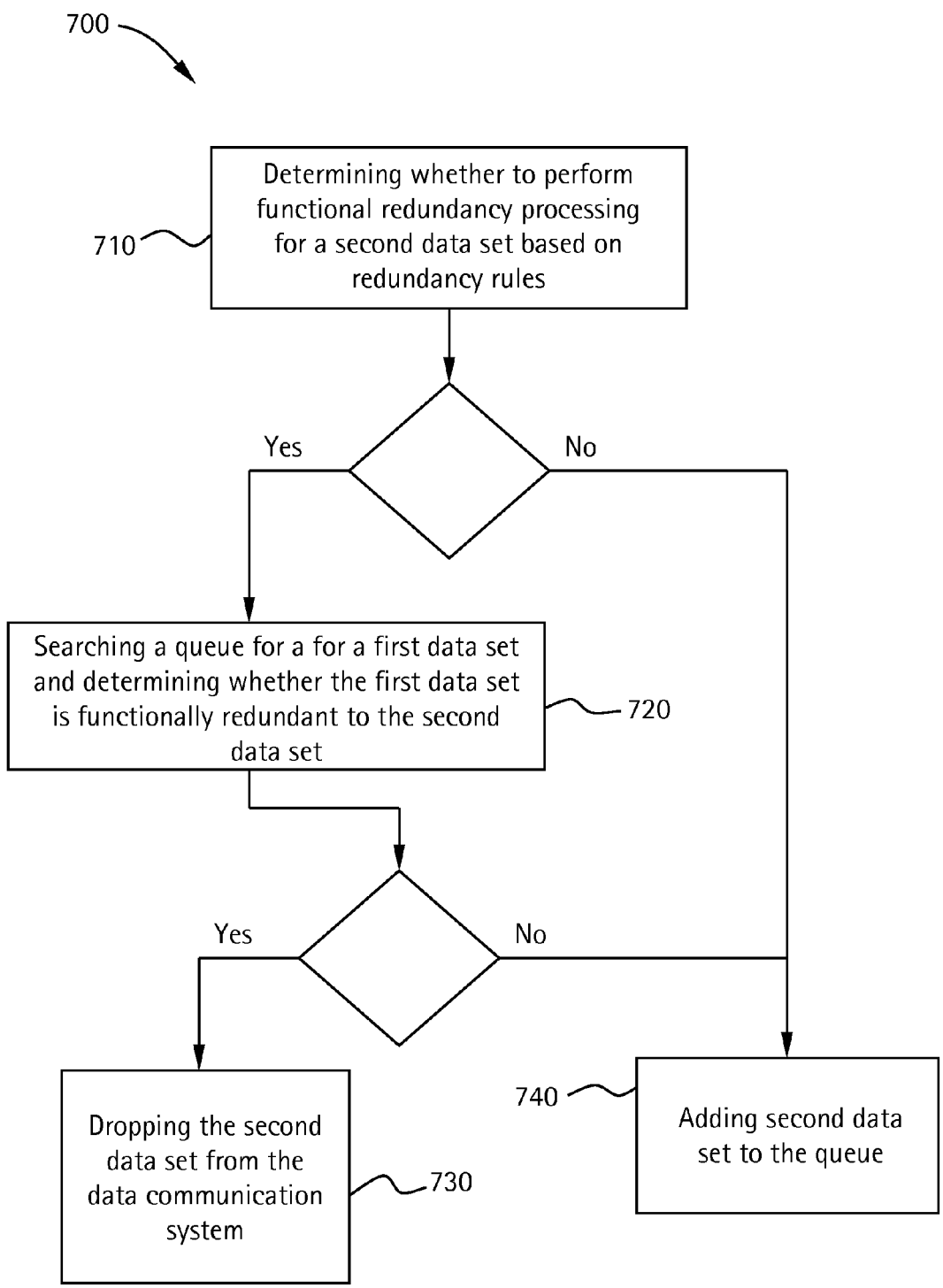
FIG. 7 illustrates a flow diagram in accordance with an embodiment of the present invention.

FIG. 7 illustrates a flow diagram 700 for the operational processor 530 in accordance with an embodiment of the present invention. At step 710, a first data set has been received and stored in the queue 540. A second data set has been received and communicated to the operational processor 530. The data communication system 410 is in a mode that utilizes functional redundancy for data from the source 420. The second data set is operated upon by the operational processor 530. The operations by the operational processor 530 may include determining whether to perform functional redundancy processing for the second data set based on the redundancy rules from the redundancy rules data base 510, as governed by the selected mode. For example, the operational processor 530 may read information from the second data set, such as the protocol information, payload, and/or time stamp of the data set. As discussed above, the protocol information may include, for example, a source address, a destination address, a source port, a destination port, a protocol type and/or a time stamp. If, for example, the redundancy rules in the redundancy rules data base 510, for the selected mode, indicate that functional redundancy should be performed for the current data set, then the operational processor performs functional redundancy processing.

If the redundancy rules dictate that functional redundancy processing is to be performed, the flow diagram indicating the functionality of the operational processor 530, moves on to step 720. If the functional redundancy rules dictate that functional redundancy processing is not to be performed, then the operational processor 530 (flow diagram) moves on to step 740 and adds the second data set to the queue 540. Once the second data set has been added to the queue 540, the second data set awaits transmission to the destination 430.

At step 720, the operational processor 530 searches the queue 540 according to the redundancy rules. In an embodiment, the operational processor 530 searches the queue 540 for a first data set that is functionally redundant to the second data set. As explained above, the operational processor determines whether a first data set is functionally redundant to the second data set based on the rules in the redundancy rules data base 510, as dictated by the selected mode. As an example, the operational processor 530 may decide that the first data set is functionally redundant to the second data set if the first and second data sets originate from the same source. As another example, the operational processor 530 may decide that the first data set is functionally redundant to the second data set if the first and second data sets originate from the same source and the difference between the time stamps is not greater than a predetermined threshold. As yet another example, the operational processor 530 may decide that the first data set is functionally redundant to the second data set if the first and second data sets have a common element that may not be useful to transmit to the destination 430 multiple times.

If, at step 720, the operational processor 530 locates functionally redundant data in the queue 540, the operational processor 530 moves on to step 730. If, at step 730, the operational processor does not locate functionally redundant data in the queue 540, the operational processor 530 moves on to step 740 and adds the second data set to the queue 540 to await transmission.

At step 730, the operational processor 530 may drop the later, second data set and leave the first data set in the queue 540. In an embodiment, it may be more efficient to for the operational processor 530 to drop the second data set rather than add the second data set to the queue and drop the first data set. In the embodiment where the first data set and the second data set generally contain similar and/or the same content, the system 500 may be generally indifferent on selecting either the first data set or the second data set for transmission. Other factors being substantially equal, the operational processor 530 may operate more efficiently to transmit the first data set and delete the second data set for certain data. The steps of the flow diagram 700 may execute repeatedly in order to utilize bandwidth efficiently.

Figure 8:
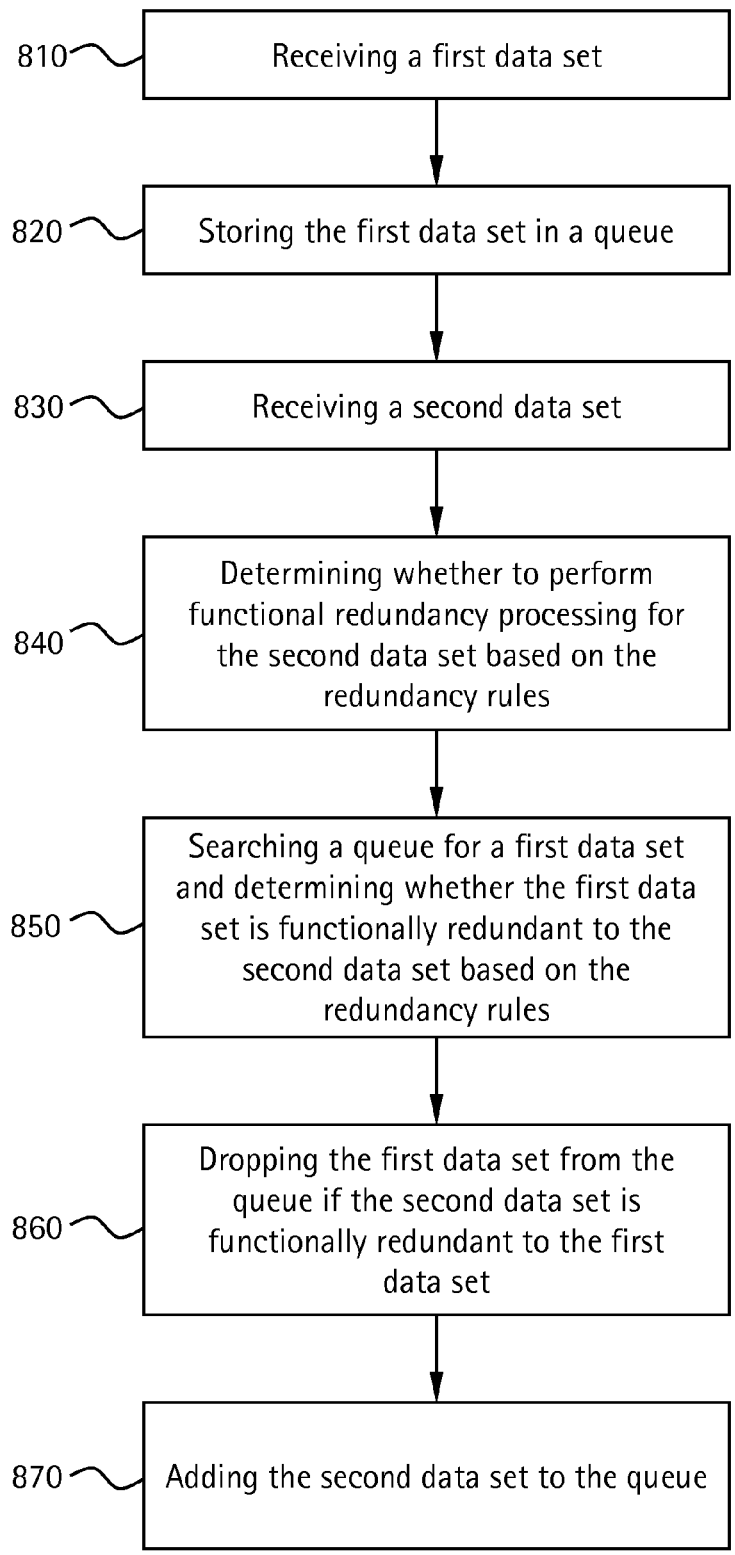
FIG. 8 illustrates a method in accordance with an embodiment of the present invention.

FIG. 8 illustrates a method 800 in accordance with an embodiment of the present invention. At step 810, a first data set may be received. At step 820, the first data set may be stored in a queue. At step 830, a second data set may be received. At step 840, it may be determined whether to perform functional redundancy processing for the second data set. The determination whether to perform functional redundancy processing for the second data set may depend on the selected mode, and the redundancy rules associated with the selected mode. The mode may be selected either manually, or automatically, based on for example, network conditions.

At step 850, the queue may be searched for a data set that may be functionally redundant to the second data set. Whether a data set located in a queue is functionally redundant to a current data set may be determined by the redundancy rules. The redundancy rules may be determined by the selected mode. As an example, the redundancy rules may dictate that the first data set is functionally redundant to the second data set if the first and second data sets originate from the same source. As another example, the redundancy rules may dictate that the first data set is functionally redundant to the second data set if the first and second data sets originate from the same source and the difference between the time stamps is not greater than a predetermined threshold. As yet another example, the redundancy rules may dictate that the first data set is functionally redundant to the second data set if the first and second data sets have the same and/or similar contents.

At step 860, if the second data set is determined to be functionally redundant to the first data set, the, earlier, first data set may be dropped from the queue. At step 870, the, later, second data set may then be added to the queue. In an embodiment, the second data set may be added to the queue such that the order of transmission of the queue is unchanged. In an embodiment, the spot in the queue is preserved as the first data set is replaced by the second data set. In another embodiment, the second data set is added to the end of the queue. Alternatively, the second data set may be added to the queue in a first-in-first-out protocol. The steps of the flow diagram 800 may execute repeatedly in order to utilize bandwidth efficiently.

One or more of the steps of the method 800 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of the method 800 steps and/or perform the steps in a different order than the order listed. For example, some steps may not be performed in certain embodiments of the present invention. As a further example, certain steps may be performed in a different temporal order, including simultaneously, than listed above.

The system and method 800 described above may be carried out as part of a computer-readable storage medium including a set of instructions for a computer. The set of instructions may include a receiving routine for receiving a first data set and a second data set. The set of instructions may also include a storing routine for storing the first data set in a queue. The set of instructions may also include a determining routine for determining whether to perform functional redundancy processing for the second data set based on redundancy rules.

The redundancy rules may be controlled by a selected mode routine. The selected mode routine may be selected by a selection routine. The selection routine may be selected by a user or may be selected dynamically based on network conditions. The redundancy rules may include a first redundancy routine for determining whether the second data set and the first data set originate from the same source node. The redundancy rules may also include a second redundancy routine for determining the time between the time stamp of the second data set and the time stamp of the first data set. The redundancy rules may also include a third redundancy routine for determining whether a common element exists between the first data set and the second data set.

The set of instructions may also include a searching routine for searching the queue for the first data set. If the first data set is functionally redundant to the second data set, the first data set may be dropped from the queue and the second data set added to the queue. In an embodiment, the spot in the queue is preserved as the first data set is replaced by the second data set. In another embodiment, the second data set is added to the end of the queue. The step of adding the second data set to the queue includes a first-in-first-out routine for adding the second data set to the queue in a first-in-first-out protocol.

FIG. 9 illustrates a method 900 in accordance with an embodiment of the present invention. At step 910, a first data set may be received. At step 920, the first data set may be stored in a queue. At step 930, a second data set may be received. At step 940, it may be determined whether to perform functional redundancy processing for the second data set. The determination whether to perform functional redundancy processing for the second data set may depend oil the selected mode, and the redundancy rules associated with the selected mode. The mode may be selected either manually, or automatically, based on for example, network conditions.

At step 950, the queue may be searched for a data set that may be functionally redundant to the second data set. Whether a data set located in a queue is functionally redundant to a current data set may be determined by the redundancy rules. The redundancy rules may be determined by the selected mode. As an example, the redundancy rules may dictate that the first data set is functionally redundant to the second data set if the first and second data sets originate from the same source. As another example, the redundancy rules may dictate that the first data set is functionally redundant to the second data set if the first and second data sets originate from the same source and the difference between the time stamps is not greater than a predetermined threshold. As yet another example, the redundancy rules may dictate that the first data set is functionally redundant to the second data set if the first and second data sets have a common element that may not be useful to transmit multiple times.

At step 960, if the second data set is determined to be functionally redundant to the first data set, the second data set may be dropped and the first data set may remain in the queue. In an embodiment, it may be more efficient to drop the second data set rather than add the second data set to the queue and drop the first data set. In the embodiment where the first data set and the second data set generally contain similar information, either the first data set or the second data set may be selected for transmission. Other factors being substantially equal, it is more efficient to transmit the first data set and drop the second data set for certain data. The steps of the flow diagram 900 may execute repeatedly in order to utilize bandwidth efficiently.

One or more of the steps of the method 900 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of the method 900 steps and/or perform the steps in a different order than the order listed. For example, some steps may not be performed in certain embodiments of the present invention. As a further example, certain steps may be performed in a different temporal order, including simultaneously, than listed above.

The system and method 900 described above may be carried out as part of a computer-readable storage medium including a set of instructions for a computer. The set of instructions may include a receiving routine for receiving a first data set and a second data set. The set of instructions may also include a storing routine for storing the first data set in a queue. The set of instructions may also include a determining routine for determining whether to perform functional redundancy processing for the second data set based on redundancy rules.

The redundancy rules may be controlled by a selected mode routine. The selected mode routine may be selected by a selection routine. The selection routine may be selected by a user or may be selected dynamically based on network conditions. The redundancy rules may include a first redundancy routine for determining whether the second data set and the first data set originate from the same source node. The redundancy rules may also include a second redundancy routine for determining the time between the time stamp of the second data set and the time stamp of the first data set. The redundancy rules may also include a third redundancy routine for determining whether the content of the first data set is functionally redundant to the content of said second data set.

The set of instructions may also include a searching routine for searching the queue for the first data set. The set of instructions may also include a transmitting routine for transmitting the first data set and dropping the second data set if the contents of the first data set are functionally redundant to the contents of the second data set.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for controlling quality of service for data communication, the method comprising:
using at least one computing device to perform the steps of:
receiving a first data set and a second data set;
storing said first data set in a queue;
determining a selected mode of said at least one computing device;
determining whether to perform functional redundancy processing for said second data set based on a set of redundancy rules retrieved from a redundancy rules data base based on said selected mode;
determining whether the content of said first data set is functionally redundant to the content of said second data set, said content of said first data set functionally redundant to said content of said second data set if it is not sufficiently different therefrom as defined by a rule; and,
transmitting said first data set and dropping said second data set if the contents of said first data set are functionally redundant to the contents of said second data set;
wherein said first data set is functionally redundant to said second data set based at least in part on a comparison of said first and second data sets where said comparison reveals a degree of difference between said contents of said first and second data sets that is below a threshold degree of difference, and wherein the first and second data sets are comprised of non-duplicate data.

2. The method of claim 1, wherein said selected mode is selected by a user.

3. The method of claim 1, wherein said selected mode is selected dynamically based on network conditions.

4. The method of claim 1, wherein said redundancy rules determine whether to perform functional redundancy processing based on information contained in the header of data in the second data set.

5. The method of claim 1, wherein said redundancy rules determine whether to perform functional redundancy processing based on information contained in the payload of the second data set.

6. The method of claim 1, wherein said redundancy rules determine whether to perform functional redundancy processing based on the source node of the second data set.

7. The method of claim 1, wherein said step of determining whether the content of the first data set is functionally redundant to the content of said second data set further includes searching said queue for said first data set and comparing the contents of said first data set with the contents of said second data set based on said redundancy rules.

8. The method of claim 1, wherein said second data set is received later in time than said first data set.

9. The method of claim 1, wherein at least one of said receiving, storing and determining steps occurs in a transport layer of a network communications protocol stack of a data communication system, or at a top of the transport layer of the network communications protocol stack of the data communication system.

10. A device comprising a non-transitory computer-readable storage medium, having stored thereon a computer program for data communication, the computer program having a plurality of code sections, the code sections executable by a computer to cause the computer to perform the steps of:
receiving a first data set and a second data set;
storing said first data set in a queue;
determining a selected mode of said at least one computing device;
determining whether to perform functional redundancy processing for said second data set based on a set of redundancy rules retrieved from a redundancy rules database based on said selected mode;
determining whether the content of said first data set is functionally redundant to the content of said second data set, said content of said first data set being functionally redundant to said content of said second data set if it is not sufficiently different therefrom as defined by a rule; and,
transmitting said first data set and dropping said second data set if the contents of said first data set are functionally redundant to the contents of said second data set;
wherein said first data set is functionally redundant to said second data set based at least in part on a comparison of said first and second data sets where said comparison reveals a degree of difference between said contents of said first and second data sets that is below a threshold degree of difference, and wherein the first and second data sets are comprised of non-duplicate data.

11. The device of claim 10, wherein said selected mode is selected by a user.

12. The device of claim 10, wherein said selected mode is selected dynamically based on network conditions.

13. The device of claim 10, wherein said redundancy rules determine whether to perform functional redundancy processing based on information contained in the header of data in the second data set.

14. The device of claim 10, wherein said redundancy rules determine whether to perform functional redundancy processing based on information contained in the payload of the second data set.

15. The device of claim 10, wherein said redundancy rules determine whether to perform functional redundancy processing based on the source node of the second data set.

16. The device of claim 10, wherein said step of determining whether the content of the first data set is functionally redundant to the content of said second data set further includes searching said queue for said first data set and comparing the contents of said first data set with the contents of said second data set based on said redundancy rules.

17. The device claim 10, wherein at least one of said receiving, storing and determining steps occurs in a transport layer of a network communications protocol stack of a data communication system, or at a top of the transport layer of the network communications protocol stack of the data communication system.

18. A method for data communication, the method comprising:
receiving a first data set;
storing said first data set in a queue;
receiving a second data set;
determining a selected mode of said at least one computing device;
determining whether to perform functional redundancy processing for said second data set based on a set of redundancy rules retrieved from a redundancy rules database based on said selected mode;
determining whether to perform functional redundancy processing for said second data set based on redundancy rules, said redundancy rules being controlled by a selected mode;
determining whether said first data set is functionally redundant to said second data set based on a rule, said content of said first data set being functionally redundant to said content of said second data set if it is not sufficiently different therefrom as defined by a redundancy rule; and,
if said first data set is functionally redundant to said second data set, dropping said second data set;
wherein said first data set is functionally redundant to said second data set based at least in part on a comparison of said first and second data sets where said comparison reveals a degree of difference between said contents of said first and second data sets that is below a threshold degree of difference, and wherein the first and second data sets are comprised of non-duplicate data.

19. The method of claim 18, wherein said content of said first data set and the content of said second data set includes audio content.

20. The method of claim 18, wherein said method occurs in a transport layer of a network communications protocol stack of a data communication system, or at a top of the transport layer of the network communications protocol stack of the data communication system.

* * * * *